United States Patent
Tanaka et al.

(10) Patent No.: US 9,955,083 B2
(45) Date of Patent: Apr. 24, 2018

(54) IMAGE PROCESSING APPARATUS, IMAGE PROCESSING METHOD, AND PROGRAM

(71) Applicant: Sony Semiconductor Solutions Corporation, Kanagawa (JP)

(72) Inventors: Hiroyuki Tanaka, Kanagawa (JP); Daisuke Kawamata, Kanagawa (JP); Shingo Nagataki, Kanagawa (JP); Ryuichi Tadano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 512 days.

(21) Appl. No.: 14/605,791

(22) Filed: Jan. 26, 2015

(65) Prior Publication Data

US 2015/0221095 A1 Aug. 6, 2015

(30) Foreign Application Priority Data

Jan. 31, 2014 (JP) ................. 2014-016530

(51) Int. Cl.
*H04N 5/235* (2006.01)
*G06T 5/50* (2006.01)
*G06T 7/246* (2017.01)

(52) U.S. Cl.
CPC ............ *H04N 5/2351* (2013.01); *G06T 5/50* (2013.01); *G06T 7/246* (2017.01); *H04N 5/2355* (2013.01); *G06T 2207/10144* (2013.01); *G06T 2207/20208* (2013.01); *G06T 2207/20216* (2013.01); *G06T 2207/20221* (2013.01)

(58) Field of Classification Search
CPC ...... H04N 5/2351; H04N 5/144; H04N 5/235; G06T 7/254; G06T 5/50; G06F 3/145; G06F 3/1454; G09G 5/06
See application file for complete search history.

(56) References Cited

U.S. PATENT DOCUMENTS

| | | | | |
|---|---|---|---|---|
| 2007/0146538 A1* | 6/2007 | Kakinuma | ............. | H04N 5/144 348/362 |
| 2011/0069205 A1* | 3/2011 | Kasai | ...................... | G06T 7/254 348/239 |
| 2011/0254976 A1* | 10/2011 | Garten | .................. | G06F 3/1454 348/229.1 |

* cited by examiner

*Primary Examiner* — Sathyanaraya V Perungavoor
*Assistant Examiner* — Patricia I Young
(74) *Attorney, Agent, or Firm* — Sheridan Ross P.C.

(57) ABSTRACT

Provided is an image processing apparatus including a generation section which generates, based on a plurality of images captured at different exposure times, index information representing an index of a brightness of the plurality of images, and a detection section which detects a moving photographic subject included in the plurality of images based on the index information.

12 Claims, 19 Drawing Sheets

BRIGHT-DARK DETECTION CONDITION

| | FIRST CODES (CODES OF N-1TH FRAME) | SECOND CODES (CODES OF NTH FRAME) |
|---|---|---|
| RA1 | 3 (HIGH LUMINANCE REGION D) | 1 (INTERMEDIATE LUMINANCE REGION B) |
| RA2 | 3 (HIGH LUMINANCE REGION D) | 0 (LOW LUMINANCE REGION A) |
| RA3 | 2 (TRANSITION REGION C) | 0 (LOW LUMINANCE REGION A) | a

DARK-BRIGHT DETECTION CONDITION

| | FIRST CODES (CODES OF N-1TH FRAME) | SECOND CODES (CODES OF NTH FRAME) |
|---|---|---|
| RB1 | 0 (LOW LUMINANCE REGION A) | 1 (INTERMEDIATE LUMINANCE REGION B) |
| RB2 | 0 (LOW LUMINANCE REGION A) | 2 (TRANSITION REGION C) |
| RB3 | 0 (LOW LUMINANCE REGION A) | 3 (HIGH LUMINANCE REGION D) |
| RB4 | 1 (INTERMEDIATE LUMINANCE REGION B) | 3 (HIGH LUMINANCE REGION D) | b

FIG. 6

BRIGHT-DARK DETECTION CONDITION

|     | FIRST CODES (CODES OF N−1TH FRAME) | SECOND CODES (CODES OF NTH FRAME) |
|-----|------------------------------------|-----------------------------------|
| RA1 | 3 (HIGH LUMINANCE REGION D)        | 1 (INTERMEDIATE LUMINANCE REGION B) |
| RA2 | 3 (HIGH LUMINANCE REGION D)        | 0 (LOW LUMINANCE REGION A)        |
| RA3 | 2 (TRANSITION REGION C)            | 0 (LOW LUMINANCE REGION A)        | a

DARK-BRIGHT DETECTION CONDITION

|     | FIRST CODES (CODES OF N−1TH FRAME) | SECOND CODES (CODES OF NTH FRAME) |
|-----|------------------------------------|-----------------------------------|
| RB1 | 0 (LOW LUMINANCE REGION A)         | 1 (INTERMEDIATE LUMINANCE REGION B) |
| RB2 | 0 (LOW LUMINANCE REGION A)         | 2 (TRANSITION REGION C)           |
| RB3 | 0 (LOW LUMINANCE REGION A)         | 3 (HIGH LUMINANCE REGION D)       |
| RB4 | 1 (INTERMEDIATE LUMINANCE REGION B) | 3 (HIGH LUMINANCE REGION D)      | b

FIG. 9
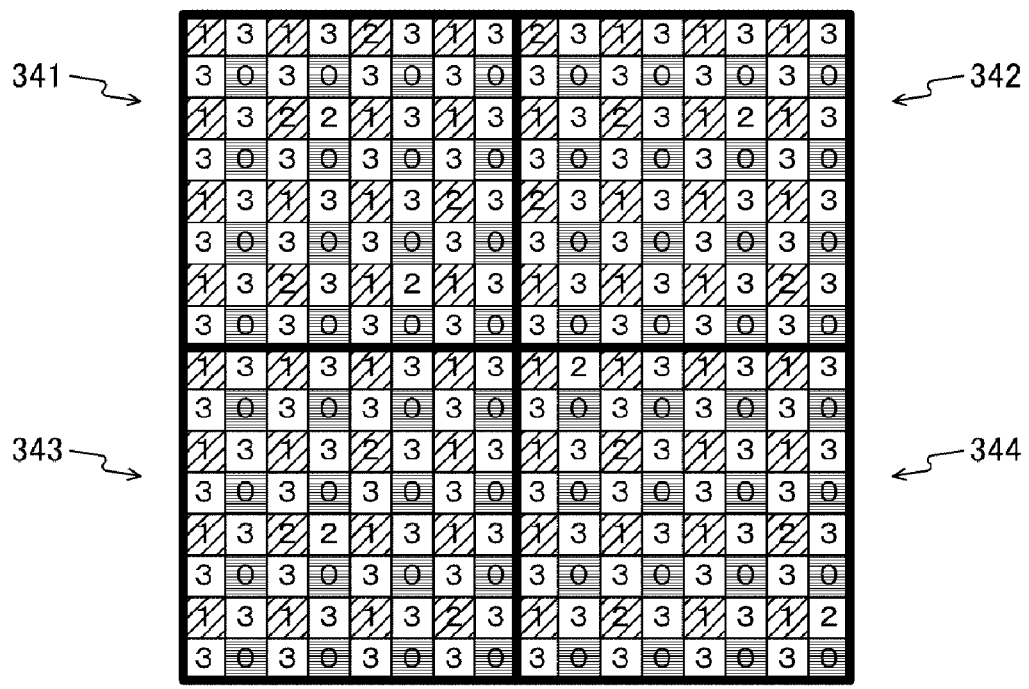
a
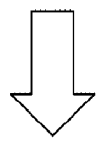
b

FIG. 10

DARK-BRIGHT DETECTION CONDITION

| | PIXEL OF INTEREST | SECOND CODES OF VICINITY PIXELS |
|---|---|---|
| RI1 | SATISFIES CONDITION RB2 | COLOR IN WHICH MAXIMUM LUMINANCE SATISFIES D (HIGH LUMINANCE REGION), AND MINIMUM LUMINANCE SATISFIES OTHER THAN D (HIGH LUMINANCE REGION), IS PRESENT |
| RI2 | SATISFIES CONDITION RB3 | COLOR IN WHICH MAXIMUM LUMINANCE SATISFIES D (HIGH LUMINANCE REGION), AND MINIMUM LUMINANCE SATISFIES OTHER THAN D (HIGH LUMINANCE REGION), IS PRESENT |
| RI3 | SATISFIES CONDITION RB4 | COLOR IN WHICH MAXIMUM LUMINANCE SATISFIES D (HIGH LUMINANCE REGION), AND MINIMUM LUMINANCE SATISFIES OTHER THAN D (HIGH LUMINANCE REGION), IS PRESENT | a

BRIGHT-DARK DETECTION CONDITION

| | PIXEL OF INTEREST | SECOND CODES OF VICINITY PIXELS |
|---|---|---|
| RJ1 | SATISFIES CONDITION RA1 | COLOR IN WHICH MAXIMUM LUMINANCE SATISFIES D (HIGH LUMINANCE REGION), AND MINIMUM LUMINANCE SATISFIES OTHER THAN D (HIGH LUMINANCE REGION), IS PRESENT |
| RJ2 | SATISFIES CONDITION RA2 | COLOR IN WHICH MAXIMUM LUMINANCE SATISFIES D (HIGH LUMINANCE REGION), AND MINIMUM LUMINANCE SATISFIES OTHER THAN D (HIGH LUMINANCE REGION), IS PRESENT |
| RJ3 | SATISFIES CONDITION RA3 | COLOR IN WHICH MAXIMUM LUMINANCE SATISFIES D (HIGH LUMINANCE REGION), AND MINIMUM LUMINANCE SATISFIES OTHER THAN D (HIGH LUMINANCE REGION), IS PRESENT | b

FIG. 11
FIRST CODES (CODES OF N-1TH FRAME)
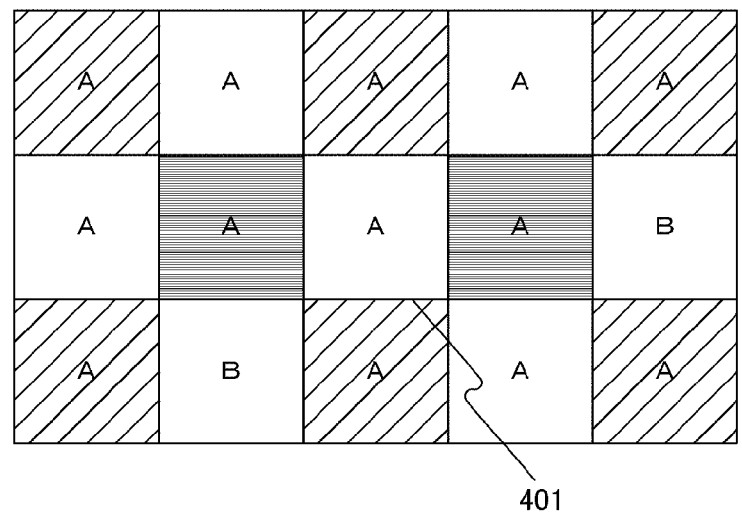
401
a
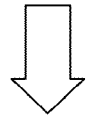
SECOND CODES (CODES OF NTH FRAME)
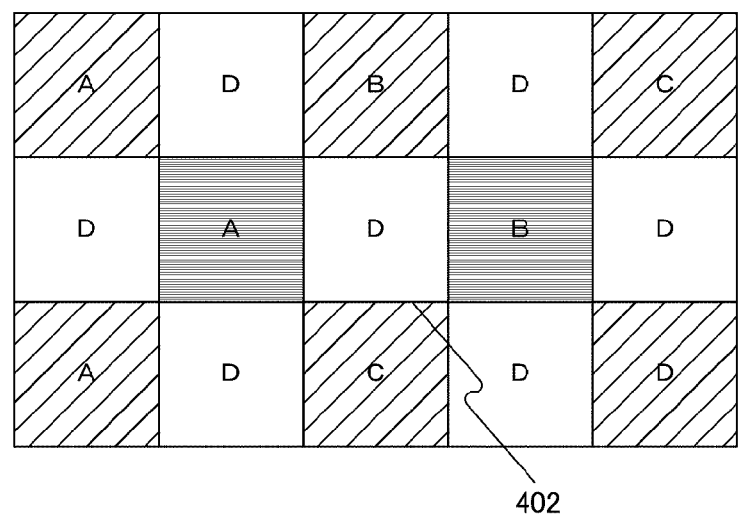
402
b

FIG. 12
FIRST CODES (CODES OF N-1TH FRAME)
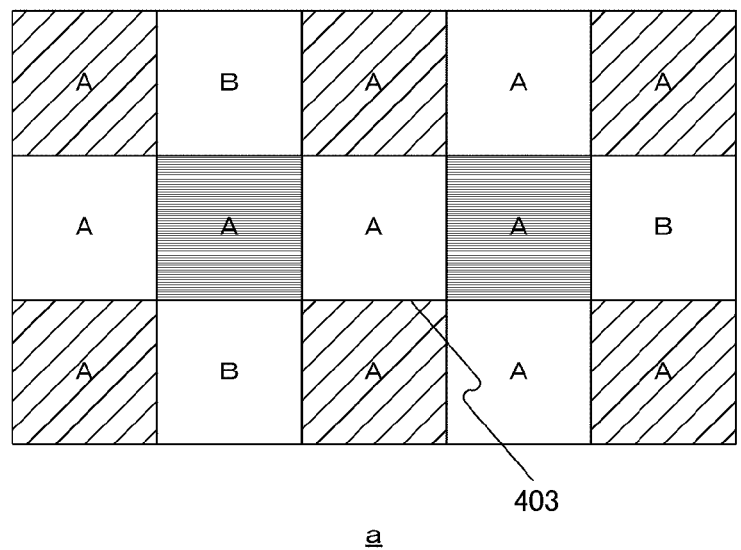
403
a
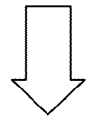
SECOND CODES (CODES OF NTH FRAME)
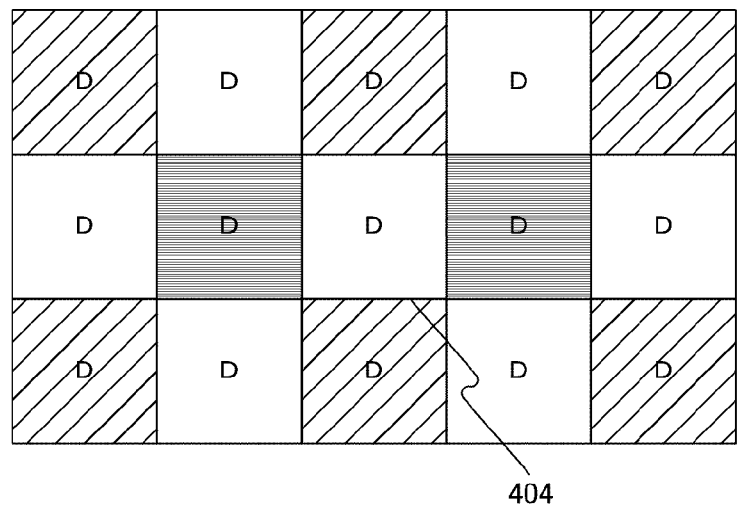
404
b

FIG. 14

SUFFICIENT CONDITION THAT IT IS
NOT MOVING PHOTOGRAPHIC SUBJECT

|  | SECOND CODES OF VICINITY PIXELS |
|---|---|
| RD1 | ALL ARE D (HIGH LUMINANCE REGION) |
| RD2 | ALL ARE C (TRANSITION REGION) OR D (HIGH LUMINANCE REGION) | a

DARK-BRIGHT DETECTION CONDITION

|  | PIXEL OF INTEREST | SUFFICIENT CONDITION THAT IT IS NOT MOVING PHOTOGRAPHIC SUBJECT |
|---|---|---|
| RK1 | SATISFIES CONDITION RB2 | DOES NOT SATISFY CONDITION RD2 |
| RK2 | SATISFIES CONDITION RB3 | DOES NOT SATISFY CONDITION RD1 |
| RK3 | SATISFIES CONDITION RB4 | DOES NOT SATISFY CONDITION RD1 | b

FIG. 15
FIRST CODES (CODES OF N-1TH FRAME)
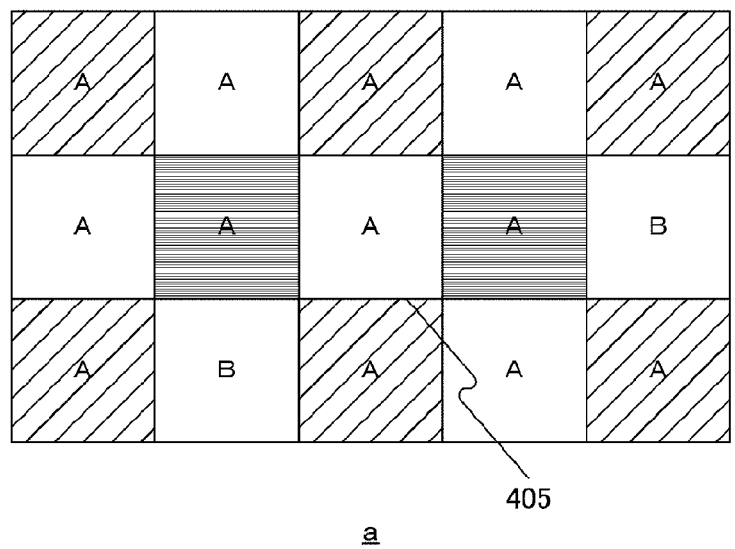
405
a
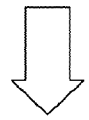
SECOND CODES (CODES OF NTH FRAME)
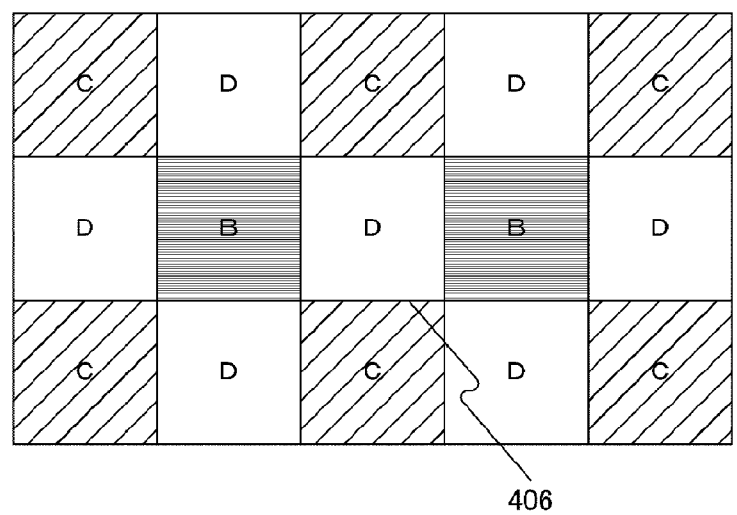
406
b

FIG. 18
LAYERED-TYPE CMOS IMAGE SENSOR
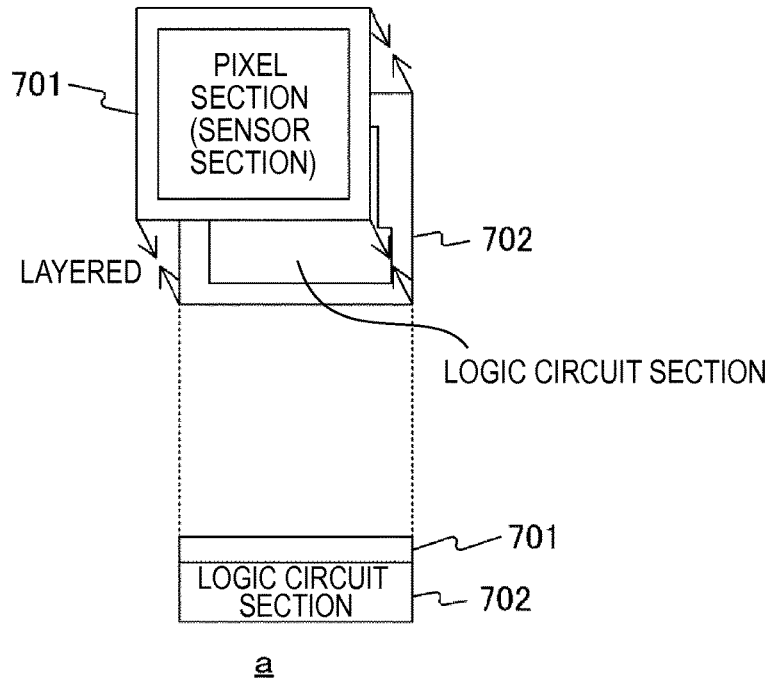
a
INVERSE IRRADIATION-TYPE CMOS IMAGE SENSOR
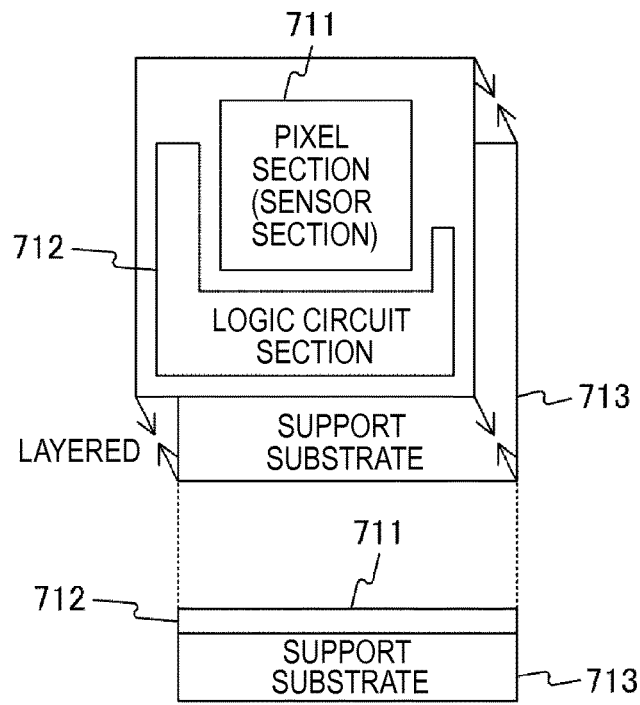
b

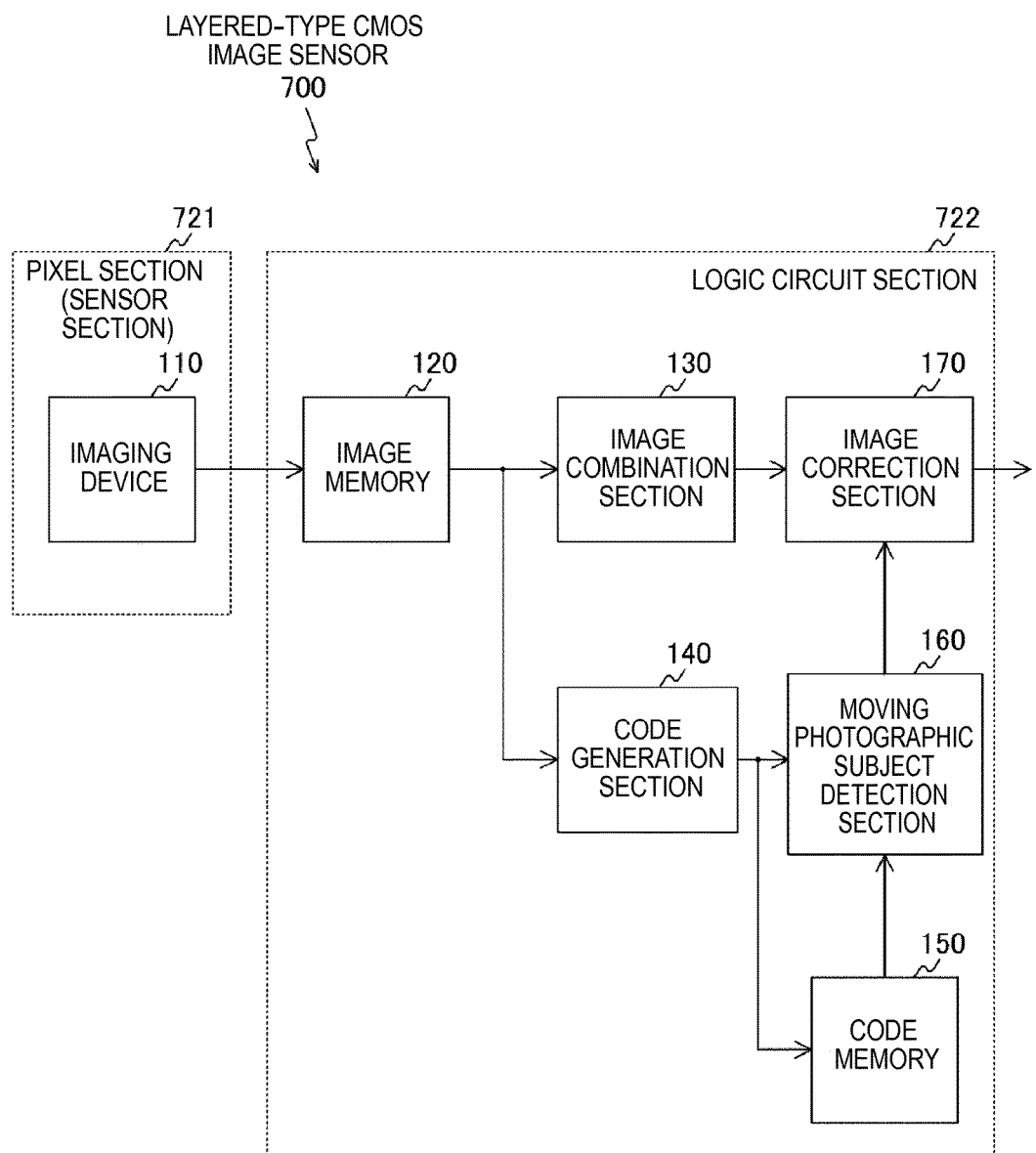

ID_PROCESSING APPARATUS, IMAGE
PROCESSING METHOD, AND PROGRAM

CROSS REFERENCE TO RELATED
APPLICATIONS

This application claims the benefit of Japanese Priority Patent Application JP 2014-016530 filed Jan. 31, 2014, the entire contents of which are incorporated herein by reference.

BACKGROUND

The present disclosure relates to an image processing apparatus. In detail, it relates to an image processing apparatus and an image processing method which detects a moving photographic subject included in an image, and a program which causes a computer to execute this method.

In recent years, image processing apparatuses have become widespread, such as digital still cameras and digital video cameras (for example, camera-integrated recorders) which generate an image (image data) by capturing a photographic subject such as a person or an animal, and record this image (image data) as image content.

Here, for example, in the case where an imaging operation is performed for a scene with a large difference of brightness and darkness, it is assumed that the dynamic range of an image sensor included in an image processing apparatus will be insufficient. In the case where the dynamic range of such an image sensor is insufficient, for example, over-exposure will often occur by a bright portion being saturated in an image generated by the imaging operation.

Accordingly, an image processing apparatus has been proposed which generates a combined image in which the dynamic range is enhanced, by combining a long time exposure image and a short time exposure image generated by an imaging operation during different exposure times. However, in the case where a moving photographic subject (a photographic subject which is moving) is included in the images used for the generation of a combined image, there is the possibility that false color, noise or the like will occur in the region of the moving photographic subject, and the quality of the image will be reduced.

Accordingly, for example, an image processing apparatus has been proposed which acquires a pixel value difference of a plurality of combined images, performs a comparison between this pixel value difference and a predetermined threshold, and estimates a region in which the pixel value difference is at or above the threshold as a moving photographic subject region (for example, refer to JP 2011-87269A).

SUMMARY

In the above described related art, a moving photographic subject included in an image can be detected. Accordingly, even in the case where a moving photographic subject is included in a combined image, the combined image can be corrected by taking into consideration this moving photographic subject.

However, in the above described related art, an image memory for holding a plurality of images may be necessary in a moving photographic subject detection process. Accordingly, the cost for including this image memory in the image processing apparatus will increase. Therefore, reducing the information amount of images which may become necessary in a moving photographic subject detection process, and reducing the cost of the image processing apparatus, will be of importance.

The present disclosure is performed by considering such a situation, and it is desirable to reduce the information amount of images which may become necessary in a moving photographic subject detection process.

According to a first embodiment of the present technology, there is provided an image processing apparatus including a generation section which generates, based on a plurality of images captured at different exposure times, index information representing an index of a brightness of the plurality of images, and a detection section which detects a moving photographic subject included in the plurality of images based on the index information. In this way, an effect is produced in which index information is generated, and a moving photographic subject is detected based on this index information.

According to the first embodiment, the generation section may generate the index information for each pixel based on a comparison result between pixel values of the plurality of images and a threshold. In this way, an effect is produced in which index information is generated for each pixel, based on a comparison result between pixel values of a plurality of images and a threshold.

According to the first embodiment, the plurality of images may be a short time exposure image and a long time exposure image, and the generation section may generate the index information for each pixel based on a comparison result between values specified by pixel values of the short time exposure image and a sum of pixel values of the short time exposure image and pixel values of the long time exposure image, and the threshold. In this way, an effect is produced in which index information is generated for each pixel, based on a comparison result between values specified by pixel values of a short time exposure image and a sum of pixel values of a short time exposure image and pixel values of a long time exposure image, and a threshold.

According to the first embodiment, the plurality of images may be a short time exposure image and a long time exposure image, and the generation section may generate the index information for each pixel based on a comparison result between values specified by pixel values of the short time exposure image and pixel values of the long time exposure image, and the threshold. In this way, an effect is produced in which index information is generated for each pixel, based on a comparison result between values specified by pixel values of a short time exposure image and pixel values of a long time exposure image, and a threshold.

According to the first embodiment, the plurality of images may be a short time exposure image and a long time exposure image, and the generation section may generate the index information for each pixel by classifying and coding each pixel constituting the plurality of images into a first level in which pixels of the long time exposure image are used in an image combination process which generates a combined image by combining the plurality of images, a second level in which a sum of pixels of the long time exposure image and pixels of the short time exposure image are used in the image combination process, a third level in which pixels of the short time exposure image are used in the image combination process, and a fourth level which belongs between the second level and the third level. In this way, an effect is produced in which each pixel is classified and coded into a first to fourth level.

According to the first embodiment, the plurality of images may be a short time exposure image and a long time exposure image, and in the case where an imaging operation is performed by an exposure system which generates only the long time exposure image from among the short time exposure image and the long time exposure image, the generation section may generate and use a virtual short time exposure image corresponding to a ratio of exposure times based on the long time exposure image. In this way, an effect is produced, in the case where an imaging operation is performed by an exposure system which generates only a long time exposure image, in which a virtual short time exposure image is generated and used.

According to the first embodiment, the detection section may detect the moving photographic subject based on a plurality of the index information generated at different times. In this way, an effect is produced in which a moving photographic subject is detected, based on a plurality of index information generated at different times.

According to the first embodiment, the detection section may detect the moving photographic subject based on a comparison result between first index information which is the index information generated at a first time, and second index information which is the index information generated at a second time later than the first time. In this way, an effect is produced in which a moving photographic subject is detected, based on a comparison result between first index information and second index information.

According to the first embodiment, the detection section may detect the moving photographic subject based on a transition between the first index information and the second index information. In this way, an effect is produced in which a moving photographic subject is detected, based on a transition between first index information and second index information.

According to the first embodiment, the detection section may detect the moving photographic subject based on a transition between the first index information and the second index information in a pixel of interest which becomes a comparison target, and the second index information in pixels in the vicinity of the pixel of interest. In this way, an effect is produced in which a moving photographic subject is detected, based on a transition between first index information and second index information in a pixel of interest, and second index information in pixels in the vicinity of the pixel of interest.

According to the first embodiment, the detection section may detect the moving photographic subject based on a transition between the first index information and the second index information in a pixel of interest which becomes a comparison target, and whether or not the second index information in pixels in the vicinity of the pixel of interest is all specific index information. In this way, an effect is produced in which a moving photographic subject is detected, based on a transition between first index information and second index information in a pixel of interest, and whether or not second index information in pixels in the vicinity of the pixel of interest are all specific index information.

According to the first embodiment, a compression section which compresses the index information, a memory which holds the compressed index information, and an expansion section which reads and expands the compressed index information held in the memory may be further included, and the detection section may detect the moving photographic subject based on the expanded index information. In this way, an effect is produced in which index information is compressed, this compressed index information is held in a memory, the index information held in the memory is read and expanded, and a moving photographic subject is detected based on this expanded index information.

According to the first embodiment, an image combination section which generates a combined image by combining the plurality of images, and an image correction section which corrects the combined image based on information related to the detected moving photographic subject may be further included. In this way, an effect is produced in which a combined image is generated by combining a plurality of images, and the combined image is corrected based on information related to a detected moving photographic subject.

According to an embodiment of the present disclosure, a superior effect can be achieved in which the information amount of images which may become necessary in a moving photographic subject detection process can be reduced. Note that, the effect described here is not necessarily limited, and may be any effect described in the present disclosure.

BRIEF DESCRIPTION OF THE DRAWINGS

FIG. 6 is a figure which shows an example of detection conditions used for a moving photographic subject detection process by a moving photographic subject detection section 160 in the first embodiment of the present disclosure;

FIG. 9 is a figure which schematically shows a code compression example by a code compression section 310, and a code expansion example by a code expansion section 330, in the second embodiment of the present disclosure;

FIG. 10 is a figure which shows an example of detection conditions used for a moving photographic subject detection process by the moving photographic subject detection section 160 in a third embodiment of the present disclosure;

FIG. 11 is a figure which shows transition examples of an image used for the moving photographic subject detection process by the moving photographic subject detection section 160 in the third embodiment of the present disclosure;

FIG. 12 is a figure which shows transition examples of an image used for the moving photographic subject detection process by the moving photographic subject detection section 160 in the third embodiment of the present disclosure;

FIG. 14 is a figure which shows an example of detection conditions used for a moving photographic subject detection process by the moving photographic subject detection section 160 in the fourth embodiment of the present disclosure;

FIG. 15 is a figure which shows transition examples of an image used for the moving photographic subject detection process by the moving photographic subject detection section 160 in the fourth embodiment of the present disclosure;

FIG. 18 is a figure which shows simplified a layered-type CMOS image sensor in a sixth embodiment of the present disclosure; and FIG. 19 is a block diagram which shows a functional configuration example of a layered-type CMOS image sensor 700 in the sixth embodiment of the present disclosure.

DETAILED DESCRIPTION OF THE EMBODIMENT(S)

Figure 1:
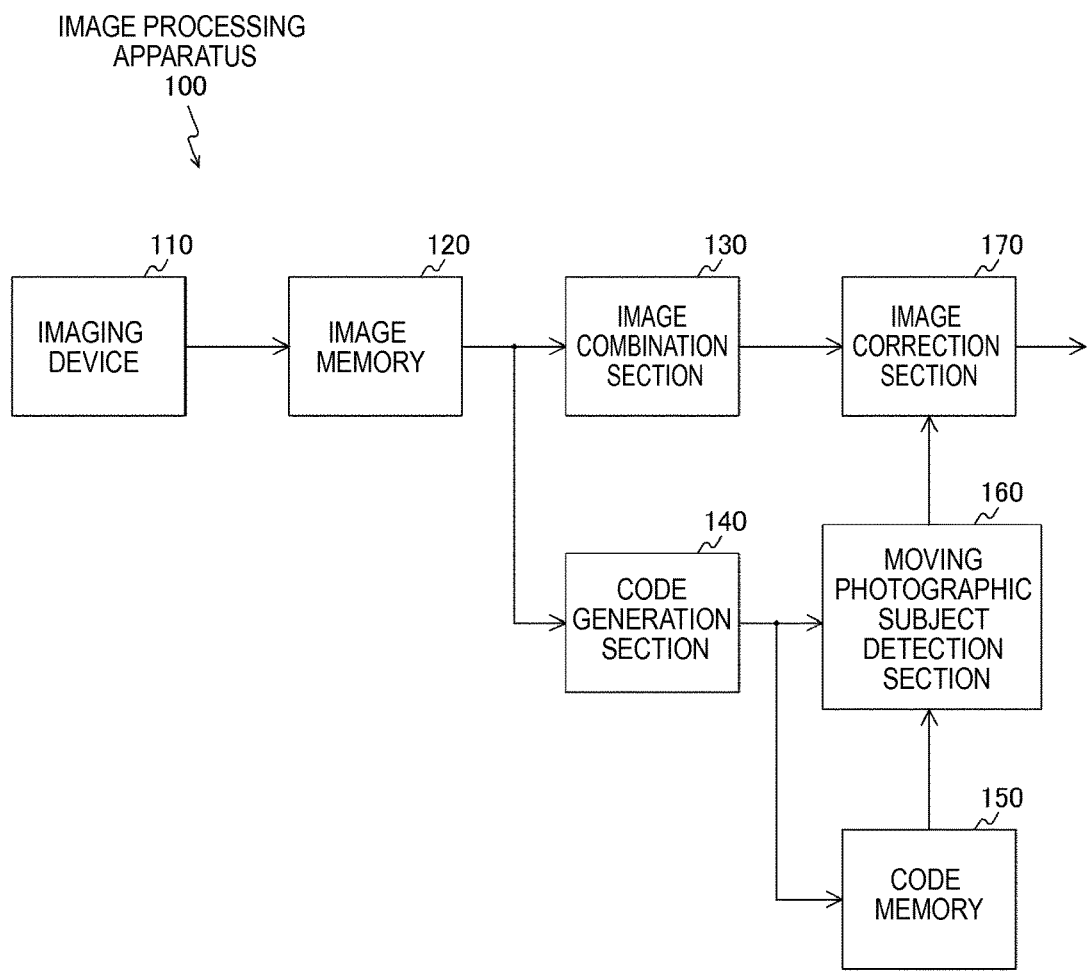
FIG. 1 is a block diagram which shows a functional configuration of an image processing apparatus 100 in a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the modes (hereinafter, called embodiments) for implementing the present disclosure will be described. A description will be made in the following order.

1. First embodiment (example in which an input image is coded for each pixel)
2. Second embodiment (example in which an input image is coded for each pixel and compressed by block units)
3. Third embodiment (example in which a moving photographic subject is detected by taking into consideration a transition between a past code and a present code in a pixel of interest, and variations of the present codes of vicinity pixels)
4. Fourth embodiment (example in which a region satisfying a sufficient condition that it is not a moving photographic subject is excluded from a moving photographic subject detection region detected by taking into consideration a transition between a past code and a present code in a pixel of interest)
5. Fifth embodiment (example in which a different exposure control system is used)
6. Sixth embodiment (example applied to a layered-type CMOS image sensor)

1. First Embodiment

[Configuration Example of the Image Processing Apparatus]

FIG. 1 is a block diagram which shows a functional configuration example of an image processing apparatus 100 in a first embodiment of the present disclosure.

The image processing apparatus 100 includes an imaging device 110, an image memory 120, an image combination section 130, a code generation section 140, a code memory 150, a moving photographic subject detection section 160, and an image correction section 170.

Figure 3:
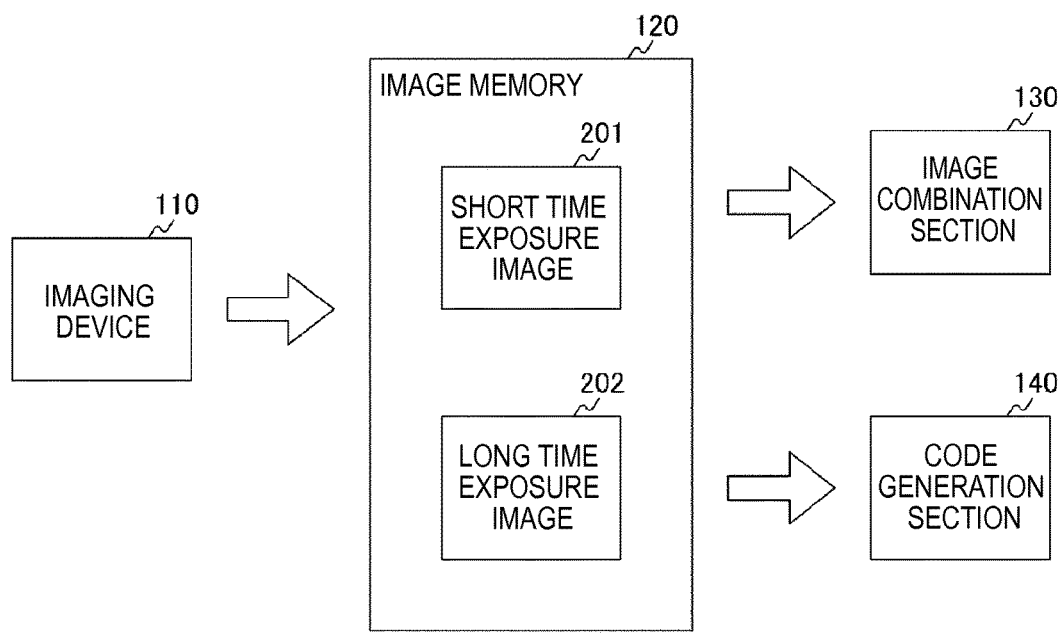
FIG. 3 is a figure which shows simplified a part of the flow of images generated by an imaging device 110 in the first embodiment of the present disclosure.

The imaging device 110 generates a plurality of images with different exposure times, and causes the generated plurality of images to be held in the image memory 120. For example, as shown in FIG. 3, the imaging device 110 generates a short time exposure image 201 and a long time exposure image 202. In this case, an exposure time TL of the long time exposure image 202 is longer than an exposure time TS of the short time exposure image 201 (that is, TS<TL). Note that, in the case where "image" is described in the embodiments of the present disclosure, the meaning of this image and the meaning of image data for displaying this image will both be included.

Further, the imaging device 110 is implemented, for example, by an image sensor. For example, a Charge Coupled Device (CCD) image sensor, a Complementary Metal Oxide Semiconductor (CMOS) image sensor or the like can be used as this image sensor. Further, another image sensor (for example, an image sensor having the configuration described in JP 2008-99158A) may be used.

The image memory 120 is a memory which holds a plurality of images generated by the imaging device 110, and supplies the held images to the image combination section 130 and the code generation section 140. For example, as shown in FIG. 3, a short time exposure image 201 and a long time exposure image 202 are held in the image memory 120. Note that, the images held in the image memory 120 may be frame units, or may be line units.

The image combination section 130 acquires the images (the plurality of images with different exposure times) held in the image memory 120, and generates a combined image by using each of these images. Then, the image combination section 130 supplies this generated combined image to the image correction section 170. For example, the image combination section 130 combines a plurality of images with different exposure times, and generates a combined image in which over-exposed pixels which become saturated pixel values are excluded.

The code generation section 140 acquires the images (the plurality of images with different exposure times) held in the image memory 120, and generates index information which represents an index of the brightness of the images, based on each of these images. Then, the code generation section 140 supplies this generated index information to the moving photographic subject detection section 160, and causes this index information to be held in the code memory 150. Note that, an example will be shown in the embodiments of the present disclosure in which code information (0 through to 4) is generated, as an example of index information which represents an index of the brightness of the images. Note that, the code generation section 140 is an example of a generation section described in the appended claims.

The code memory 150 holds the index information (for example, the code information (0 through to 4)) generated by the code generation section 140, and supplies the held index information to the moving photographic subject detection section 160. For example, codes (codes generated for an N−1th frame) held in the code memory 150 are used in moving photographic subject detection for an input image of an Nth frame.

The moving photographic subject detection section 160 detects a moving photographic subject included in the images, based on the index information (for example, the code information (0 through to 4)) generated by the code generation section 140. For example, the moving photographic subject detection section 160 detects a moving photographic subject included in the images generated by the imaging device 110, based on the codes held in the code memory 150 and the codes output from the code generation section 140. Then, the moving photographic subject detection section 160 generates information (moving photographic subject information) related to the detected moving photographic subject, and outputs the generated information to the image correction section 170. Note that, the moving photographic subject detection section 160 is an example of a detection section described in the present disclosure.

The image correction section 170 corrects the combined image generated by the image combination section 130, and outputs this image which has been corrected (corrected image). For example, in the case where a moving photographic subject is included in the combined image generated by the image combination section 130, this combined image will include regions (image quality deterioration regions) in which false color, noise or the like is generated due to this moving photographic subject. Accordingly, the image correction section 170 corrects the image quality deterioration regions in the combined image generated by the image combination section 130, based on the moving photographic subject information output from the moving photographic subject detection section 160. Note that, a correction process by the image correction section 170 may be performed for the image prior to a de-mosaic process, may be performed for the image after a de-mosaic process, or may use both or either. Further, the image correction section 170 may perform another correction process, based on the moving photographic subject information output from the moving photographic subject detection section 160 (for example, refer to JP 2008-227697A).

[Relation Example Between the Combined Image and the Moving Photographic Subject]

Here, a generation example of a short time exposure image and a long time exposure image used for generating an image with a wide dynamic range will be described. Here, an example will be shown which uses a solid-state image sensor such as a CCD image sensor or a CMOS image sensor used in an imaging apparatus such as a digital video camera or a digital still camera.

Such a solid-state image sensor performs photoelectric conversion which accumulates a charge corresponding to an incident light amount, and outputs electrical signals corresponding to this accumulated charge. However, there is an upper limit for the charge accumulation amount in photoelectric conversion elements which perform photoelectric conversion, and when a certain level of a light amount or more is received, the accumulated charge amount will reach a saturation level. Accordingly, a photographic subject region with a certain level of brightness or more will be set to a saturated luminance level, and so-called over-exposure will be generated.

In order to prevent such a phenomenon, a process is performed which adjusts an exposure time by controlling a charge accumulation period in the photoelectric conversion elements, in accordance with changes of external light or the like, and controls the sensitivity to an optimum value. For example, for a bright photographic subject, the exposure time is shortened by activating the shutter at high speed, and the charge accumulation period is shortened in the photoelectric conversion elements. In this way, electrical signals can be caused to be output prior to the accumulated charge amount reaching a saturation level. By such a process, it becomes possible to output an image in which a gradation corresponding to a photographic subject is accurately reproduced.

However, when the shutter is activated at high speed, in the imaging of a photographic subject in which bright portions and dark portions are mixed, there is the possibility of not having a sufficient exposure time for the dark portions. In this way, in the case of not having a sufficient exposure time, the Signal to Noise Ratio (S/N) will deteriorate, and the image quality will decline.

In order for the luminance levels of the bright portions and the dark portions to be accurately reproduced, in a captured image of such a photographic subject in which the bright portions and the dark portions are mixed, it may be necessary to implement a high S/N as a long exposure time, for the pixels where there is little incident light on an image sensor. Further, a process may become necessary which avoids saturation, for the pixels where there is a lot of incident light.

A technique which uses a plurality of images with different exposure times is well-known as a technique which implements such a process. In this technique, an optimal pixel level is determined by using a long time exposure image in image regions which are dark, and using a short time exposure image in image regions which are bright, such as those which will become over-exposed in the long time exposure image. In this way, by combining a plurality of images with different exposures, an image with a wide dynamic range which is not over-exposed can be obtained. This example will be shown in FIG. 2.

Figure 2:
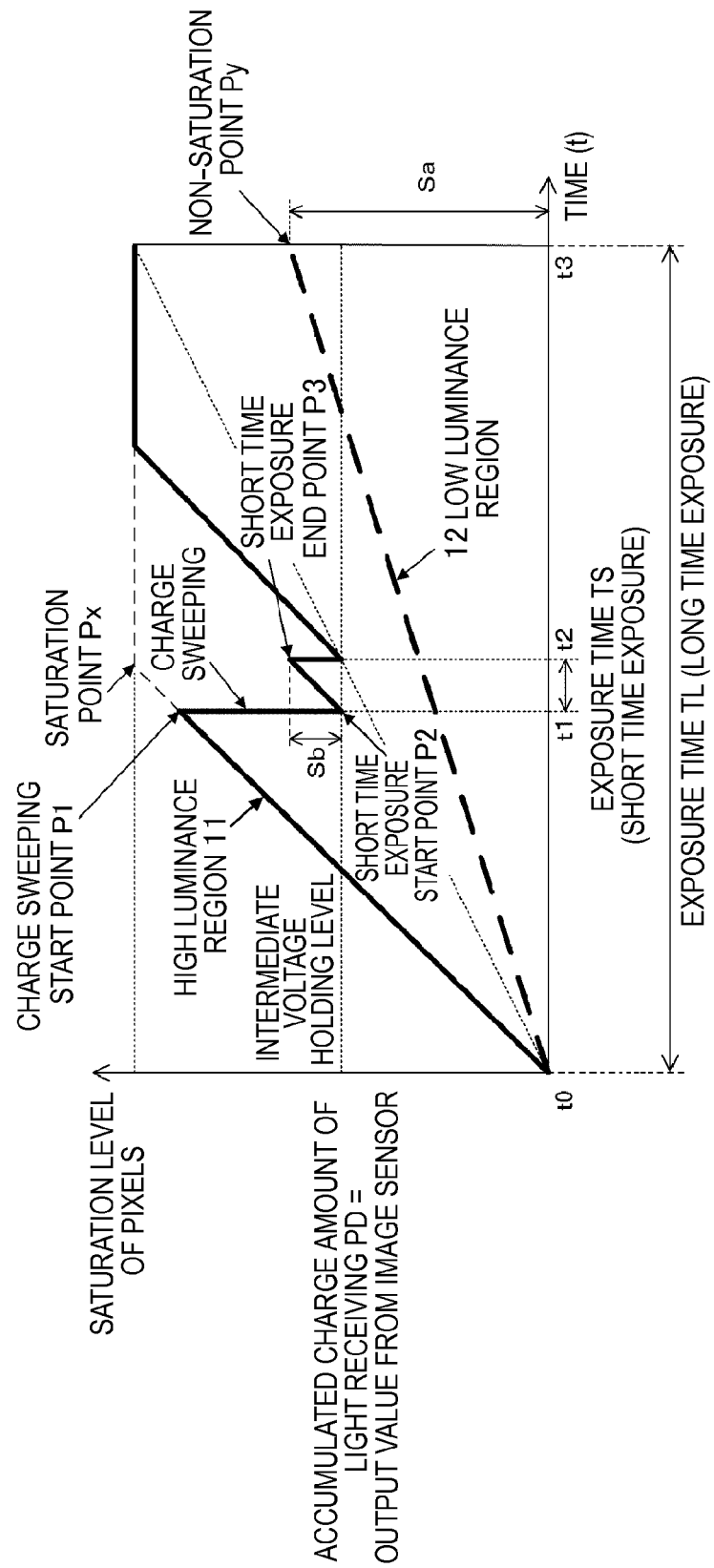
FIG. 2 is a figure which represents a transition of a charge amount of photoelectric conversion elements which becomes a basis of the present disclosure.

FIG. 2 is a figure which represents a transition of a charge amount of photoelectric conversion elements which becomes a basis of the present disclosure. In FIG. 2, a configuration is disclosed in which an image with a wide dynamic range is obtained by combining a plurality of images with different exposure amounts. Further, the characteristics of two images with different exposure times (a long time exposure image and a short time exposure image), which are generated by an imaging device, are described in FIG. 2.

The imaging device outputs, for example, image data of two different exposure times within a video rate (30 through to 60 frames per second (fps)), in video imaging. Further, image data of two different exposure times is also generated and output, in still image imaging.

Further, in the graph shown in FIG. 2, the horizontal axis is a time axis (t), and the vertical axis is an axis which represents an accumulated charge amount (e) in light receiving photodiodes (PD) constituting photoelectric conversion elements, each of which corresponds to one pixel of a solid-state image sensor.

For example, in the case where the light receiving amount of the light receiving photodiodes (PD) is large (that is, in the case corresponding to a bright photographic subject), the charge accumulation amount will rapidly increase in accordance with the passing of time, such as shown in the high luminance region 11. On the other hand, in the case where the light receiving amount of the light receiving photodiodes (PD) is small (that is, in the case corresponding to a dark photographic subject), the charge accumulation amount will gradually increase in accordance with the passing of time, such as shown in the low luminance region 12.

Further, the time t0 through to t3 corresponds to an exposure time TL for acquiring a long time exposure image. Further, the straight line corresponding to the low luminance region 12 is a charge accumulation amount which does not reach a saturation level at time t3 (non-saturation point Py).

Accordingly, an accurate gradation expression can be obtained, by a gradation level of the pixels determined by using electrical signals obtained based on this charge accumulation amount (Sa).

However, the straight line corresponding to the high luminance region 11 is a charge accumulation amount which reaches a saturation level, prior to reaching time t3 (saturation point Px). Therefore, in such a high luminance region 11, only pixel values corresponding to electrical signals of a saturation level can be obtained from a long time exposure image, and as a result will become over-exposed pixels.

Accordingly, in such a high luminance region 11, the accumulated charge of the light receiving photodiodes (PD) is swept once, at a time prior to reaching time t3 (for example, time T1 (charge sweeping start point P1)). In this case, the charge sweeping is not performed for all the charge accumulated in the light receiving photodiodes (PD), and is performed for up to an intermediate voltage holding level controlled in the photodiodes (PD).

After this charge sweeping process, short time exposure is executed again at the exposure time TS (from t1 to t2). That is, short time exposure is performed for the period from a short time exposure start point P2 up to a short time exposure end point P3. A charge accumulation amount (Sb) is obtained by this short time exposure, and a gradation level of the pixels is determined, based on electrical signals obtained based on this charge accumulation amount (Sb).

Here, a case will be assumed in which pixel values are determined based on electrical signals based on the charge accumulation amount (Sa) obtained by long time exposure in the low luminance region 12, and electrical signals based on the charge accumulation amount (Sb) obtained by short time exposure in the high luminance region 11. In this case, an estimated charge accumulation amount of the case of performing a same time exposure is calculated, or an electrical signal output value corresponding to this estimated charge accumulation amount is calculated, and a pixel value level is determined based on the calculated result.

In this way, by combining a short time exposure image and a long time exposure image, an image with a wide dynamic range which is not over-exposed can be obtained.

However, such a plurality of images with different exposure amounts will become images captured with different timings time-wise. Therefore, when movement of a photographic subject occurs during this, a displacement of the images will occur at the time of combining the images. As a result of this, there is the possibility that false color, noise or the like will occur in the imaged portion of a moving photographic subject region, and the quality of the image will be reduced.

Accordingly, an example will be shown, in the embodiments of the present disclosure, in which a moving photographic subject included in an image is appropriately detected. In this case, reducing the information amount of images which may become necessary in a moving photographic subject detection process, and reducing the cost of the image processing apparatus, will be of importance. Accordingly, an example will be shown, in the embodiments of the present disclosure, in which the information amount of images which may become necessary in a moving photographic subject detection process is reduced.

[Flow Example of the Short Time Exposure Image and the Long Time Exposure Image]

FIG. 3 is a figure which shows simplified a part of the flow of images generated by the imaging device 110 in the first embodiment of the present disclosure.

As described above, the imaging device 110 generates a short time exposure image 201 and a long time exposure image 202, and causes this generated short time exposure image 201 and long time exposure image 202 to be held in the image memory 120.

The short time exposure image 201 and the long time exposure image 202 held in the image memory 120 are supplied to the image combination section 130 and the code generation section 140.

[Transition Example of a Charge Amount]

Figure 4:
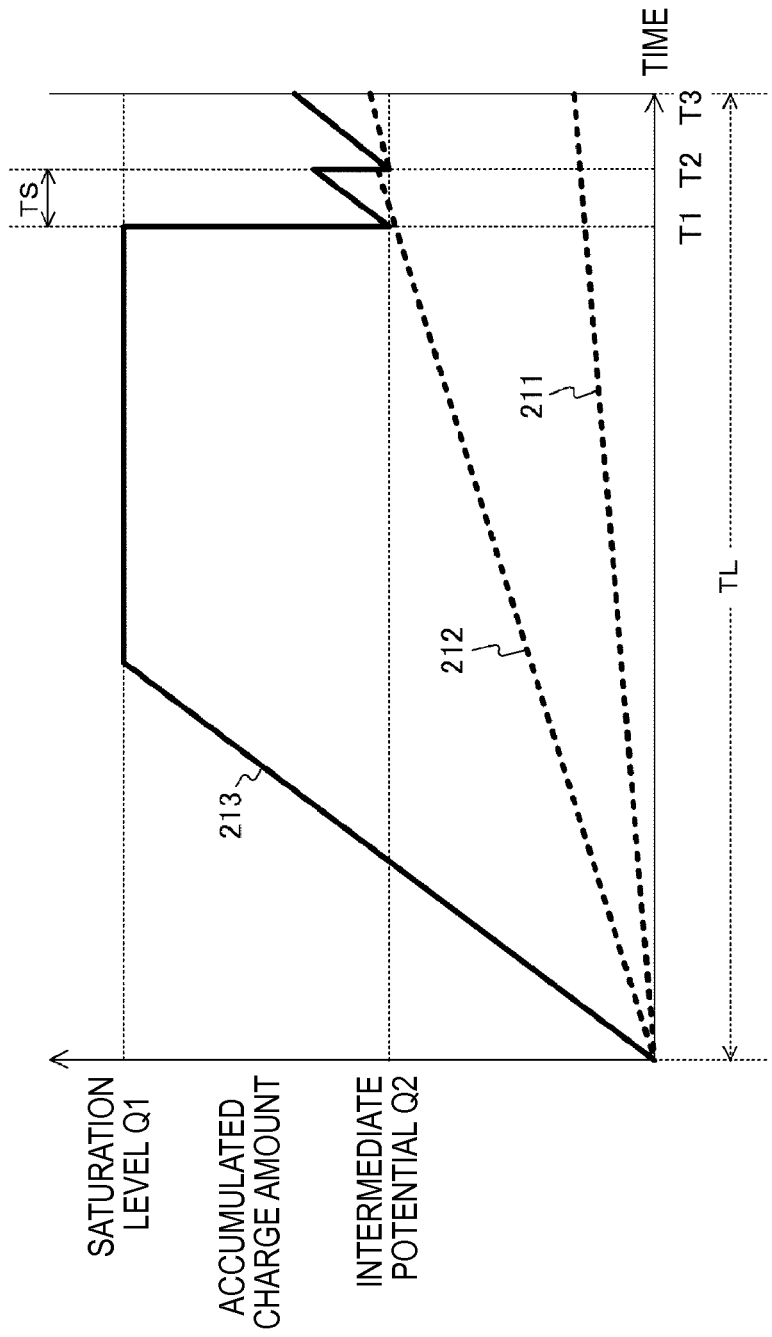
FIG. 4 is a figure which represents a transition of a charge amount of photoelectric conversion elements constituting the imaging device 110 in the first embodiment of the present disclosure.

FIG. 4 is a figure which represents a transition of a charge amount of photoelectric conversion elements constituting the imaging device 110 in the first embodiment of the present disclosure.

Here, the determination method of codes in the case where the codes are generated by the code generation section 140 will depend on the exposure system. Accordingly, a transition example will be shown in FIG. 4 in the case where an example of an exposure system (for example, refer to JP 2008-99158A) is used.

The horizontal axis of the graph shown in FIG. 4 represents a time, and the vertical axis represents a charge amount. Further, an accumulation time of the long time exposure image is represented by TL, and an accumulation time of the short time exposure image is represented by TS.

Further, a saturation level of the charge accumulation of pixels is represented by Q1, and the intermediate potential for reading the short time exposure image is represented by Q2. Further, time T1 represents the timing for resetting to the intermediate potential Q2 prior to starting short time exposure. Further, time T2 represents the timing for reading the charge accumulated in the period TS. Further, time T3 represents the timing for reading the charge accumulated in the period TL.

For example, the charge exposed during the period TS is read based on the intermediate potential Q2, and the read charge is AD converted and output from the imaging device 110 as a short time exposure image. Further, the charge remaining in the photoelectric conversion elements after the period TL is read, and the read charge is AD converted and output from the imaging device 110 as a long time exposure image.

Here, in the case of a low luminance signal, an accumulation process of the charge will be undertaken, such as shown in the dotted straight line 211. Accordingly, a true value will appear in the long time exposure image. Further, in the case of a high luminance signal, an accumulation process of the charge will be undertaken, such as shown in the solid straight line 213. Accordingly, a true value can be calculated by multiplying the gain (TL/TS) corresponding to a ratio of the exposure times by the pixel values of the short time exposure image.

Further, in the case of an intermediate luminance signal, an accumulation process of the charge will be undertaken, such as shown in the dotted straight line 212. Accordingly, a true value can be calculated by adding the pixel values of the short time exposure image and the pixel values of the long time exposure image.

The code generation section 140 generates codes (index information) which represent an index of the brightness of the images, by using the pixel values of the short time exposure image and the pixel values of the long time exposure image generated such as this. A generation example of this code is shown in FIG. 5.

[Generation Example of Codes]

Figure 5:
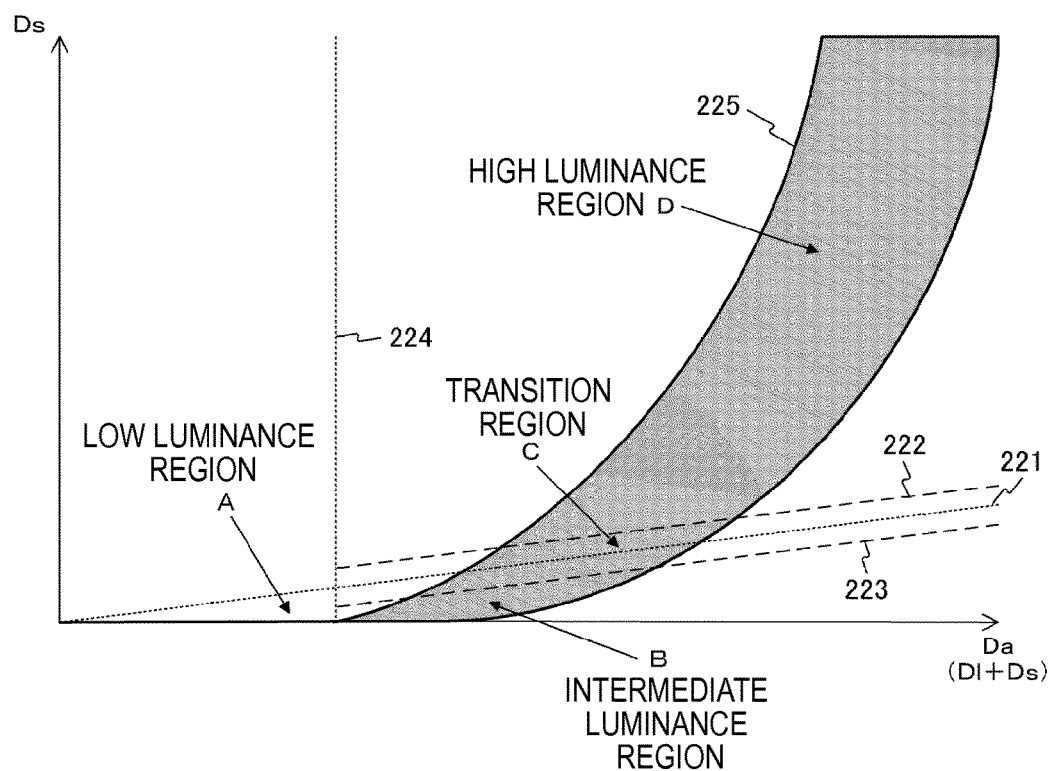
FIG. 5 is a figure which schematically shows an example of a code generation process by a code generation section 140 in the first embodiment of the present disclosure.

FIG. 5 is an example which schematically shows an example of a code generation process by the code generation section 140 in the first embodiment of the present disclosure.

The horizontal axis of the graph shown in FIG. 5 represents a sum Da of the pixel values Ds of the short time exposure image 201 and the pixel values D1 of the long time exposure image 202. Further, the vertical axis of the graph shown in FIG. 5 represents pixel values Ds of the short time exposure image 201.

Further, in the graph shown in FIG. 5, the region 225 to which a grey color is fixed within it shows simplified a region which is assumed to be that plotted by the pixel values Ds of the short time exposure image 201, and a sum Da of the pixel values Ds of the short time exposure image 201 and the pixel values D1 of the long time exposure image 202.

The dotted straight line 221 is a straight line in which the reciprocal of a ratio TL/TS of exposure times is set to an inclination, and becomes a boundary at which the intermediate luminance signal shown in FIG. 4 (shown by the dotted straight line 212) and the high luminance signal (shown by the solid straight line 213) are switched. For example, the dotted straight line 221 can be set to a straight line corresponding to Da/16.

Here, in the graph shown in FIG. 5, the region on the left side of the dotted straight line 224 is defined as a low luminance region A. Further, the straight line 224 is specified by a predetermined threshold for defining the low luminance region A. For example, the straight line 224 can be set, by setting a value close to an intermediate level of a saturation level as a threshold value.

Further, in the graph shown in FIG. 5, the dotted straight line 223 moves parallel under the dotted straight line 221. Further, the region enclosed by the horizontal axis of the graph shown in FIG. 5, the dotted straight line 223 and the dotted straight line 224 is defined as an intermediate luminance region B. Further, the parallel movement amount of the dotted straight line 223 is specified by a predetermined value for defining the intermediate luminance region B.

Further, in the graph shown in FIG. 5, the dotted straight line 222 moves parallel above the dotted straight line 221. Further, in the graph shown in FIG. 5, the region enclosed by the dotted straight line 222, the dotted straight line 223 and the dotted straight line 224 is defined as a transition region C. Further, the parallel movement amount of the dotted straight line 222 is specified by a predetermined value for defining the transition region C.

Further, in the graph shown in FIG. 5, the region enclosed by the dotted straight line 222 and the dotted straight line 224 is defined as a high luminance region D.

In this way, each of the four types of regions A through to D, which have an unequal spacing, are defined in the graph shown in FIG. 5.

Here, each of the regions A through to D will be described.

Region A is a region corresponding to a level at which the pixels of the long time exposure image are mainly used in an image combination process performed by the image combination section 130.

The region B is a region corresponding to a level at which a sum of the pixels of the long time exposure image and the pixels of the short time exposure image is mainly used in an image combination process performed by the image combination section 130.

The region D is a region corresponding to a level at which only the pixels of the short time exposure image are used in an image combination process performed by the image combination section 130.

The region C is a region corresponding to a level which belongs between the level corresponding to the region B and the level corresponding to the region D.

Also, the code generation section 140 classifies and codes each of the pixels constituting the images generated by the imaging device 110, by using each of these regions A through to D.

Specifically, the code generation section 140 plots, on the graph shown in FIG. 5, the pixel values Ds of the short time exposure image 201, and a sum Da of the pixel values Ds of the short time exposure image 201 and the pixel values D1 of the long time exposure image 202, by using the short time exposure image 201 and the long time exposure image 202.

To continue, the code generation section 140 classifies the points plotted in the graph shown in FIG. 5 into the four regions of the low luminance region A, the intermediate luminance region B, the transition region C and the high luminance region D. Then, the code generation section 140 codes each pixel into codes corresponding to each of the regions of the low luminance region A, the intermediate luminance region B, the transition region C and the high luminance region D.

For example, the code generation section 140 can perform coding so as to set the low luminance region A to 0, set the intermediate luminance region B to 1, set the transition region C to 2, and set the high luminance region D to 3.

In this way, the code generation section 140 can generate codes (index information) for each pixel, based on a comparison result between the pixel values of a plurality of images (the short time exposure image and the long time exposure image), and a threshold. That is, the code generation section 140 can generate codes (index information) for each pixel, based on a comparison result between values specified by the pixel values Ds of the short time exposure image and a sum Da of the pixel values of the short time exposure image and the pixel values of the long time exposure image, and a threshold.

Further, the code generation section 140 outputs the generated codes to the moving photographic subject detection section 160, and causes the output codes to be held in the code memory 150. In this way, the codes held in the code memory 150 are supplied to the moving photographic subject detection section 160. For example, the codes held in the code memory 150 for an N−1th frame are used in moving photographic subject detection for an input image of the Nth frame.

Note that, in the first embodiment of the present disclosure, the codes read from the code memory 150 (that is, the codes of one frame prior (past codes)) will be described by being called first codes, and the codes output from the code generation section 140 (present codes) will be described by being called second codes.

Further, each of the above described thresholds can be arbitrarily set in accordance with the exposure system. That is, thresholds suitable for the exposure system (thresholds set for an unequal spacing) can be used. Further, each of the thresholds shown hereinafter can similarly be arbitrarily set in accordance with the exposure system.

[Detection Example of the Moving Photographic Subject]

FIG. 6 is a figure which shows an example of detection conditions used for a moving photographic subject detection process by the moving photographic subject detection section 160 in the first embodiment of the present disclosure.

An example of a detection rule is shown in a of FIG. 6 in the case where a photographic subject, which is a bright part in an N−1th frame, changes to a dark part in an Nth frame due to the influence of a moving photographic subject. This detection rule is defined as a bright-dark detection condition.

For example, pixels coded to 3 (high luminance region D) by the code generation section 140, in the N−1th frame, and coded to 1 (intermediate luminance region B) by the code generation section 140, in the Nth frame, will satisfy the condition RA1 shown in a of FIG. 6.

For example, the moving photographic subject detection section 160 outputs 1, as a bright-dark detection result, for the pixels which satisfy any of the conditions RA1 through to RA3, and outputs 0, as a bright-dark detection result, for the pixels which do not satisfy any of the conditions RA1 through to RA3.

Note that, the conditions RA1 through to RA3 may use only one condition, in accordance with an intended moving photographic subject detection region, or may use a plurality of conditions as OR conditions.

An example of a detection rule is shown in b of FIG. 6 in the case where a photographic subject, which is a dark part in an N−1th frame, changes to a bright part in an Nth frame due to the influence of a moving photographic subject. This detection rule is defined as a dark-bright detection condition.

For example, pixels coded to 0 (low luminance region A) by the code generation section 140, in the N−1th frame, and coded to 1 (intermediate luminance region B) by the code generation section 140, in the Nth frame, will satisfy the condition RB1 shown in b of FIG. 6.

For example, the moving photographic subject detection section 160 outputs 1, as a dark-bright detection result, for the pixels which satisfy any of the conditions RB1 through to RB4, and outputs 0, as a dark-bright detection result, for the pixels which do not satisfy any of the conditions RB1 through to RB4.

Note that, the conditions RB1 through to RB4 may use only one condition, in accordance with an intended moving photographic subject detection region, or may use a plurality of conditions as OR conditions.

In this way, a detection rule can be defined as a transition between the first codes and the second codes. Further, the detection rules shown in a and b of FIG. 6 are examples, and are not limited to these. That is, it is preferable for an appropriate code transition to be adopted, as a detection rule, in accordance with the exposure system and an intended moving photographic subject detection region.

In this way, the moving photographic subject detection section 160 can obtain a bright-dark detection result (0,1) and a dark-bright detection result (0,1), based on the first codes read from the code memory 150 and the second codes output from the code generation section 140. Also, the moving photographic subject detection section 160 outputs values (0,1), which take a logical sum (OR) of the bright-dark detection result (0,1) and the dark-bright detection result (0,1), to the image correction section 170 as moving photographic subject information.

Here, the pixels in which the moving photographic subject information is 1 can be determined to correspond to pixels of a region corresponding to the moving photographic subject. Further, the pixels in which the moving photographic subject information is 0 can be determined to correspond to pixels of a region other than the region corresponding to the moving photographic subject.

In this way, the moving photographic subject detection section 160 can detect a moving photographic subject, based on a plurality of codes (index information) generated at different times. For example, the moving photographic subject detection section 160 can detect a moving photographic subject, based on a comparison result between codes generated at a first time (first codes), and second codes generated at a second time later than the first codes. In this case, the moving photographic subject detection section 160 can detect a moving photographic subject, based on a transition between the first codes and the second codes.

[Operation Example of the Image Processing Apparatus]

Figure 7:
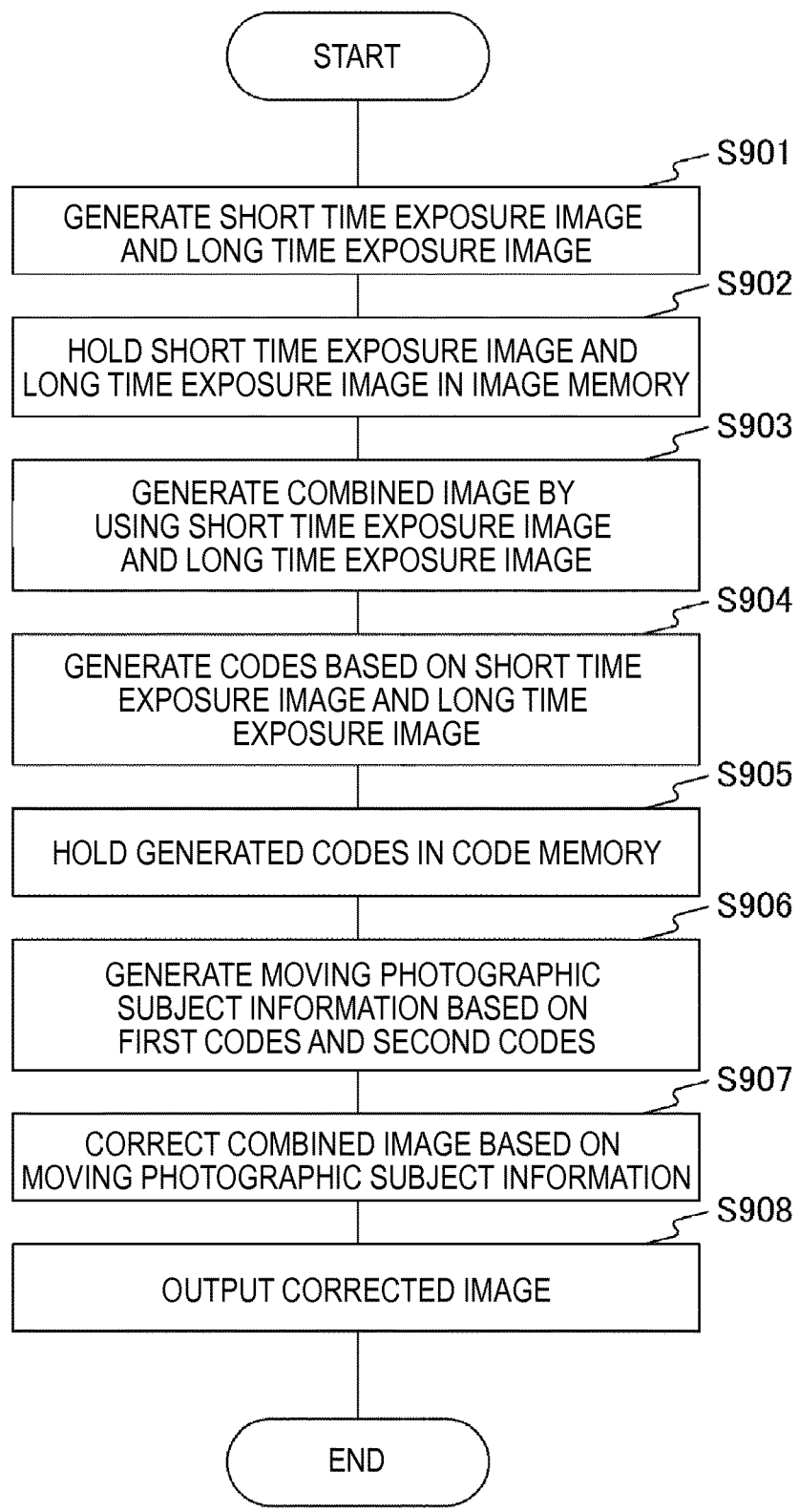
FIG. 7 is a flow chart which shows an example of a process procedure of the moving photographic subject detection process by the image processing apparatus 100 in the first embodiment of the present disclosure.

FIG. 7 is a flow chart which shows an example of a process procedure of the moving photographic subject detection process by the image processing apparatus 100 in the first embodiment of the present disclosure.

Firstly, the imaging device 110 generates a short time exposure image and a long time exposure image (step S901). To continue, the imaging device 110 causes the generated short time exposure image and the long time exposure image to be held in the image memory 120 (step S902).

To continue, the image combination section 130 generates a combined image by using the short time exposure image and the long time exposure image held in the image memory 120 (step S903).

To continue, the code generation section 140 generates codes for each pixel, based on the short time exposure image and the long time exposure image held in the image memory 120 (step S904). Note that, step S904 is an example of a generation procedure described in the present disclosure. To continue, the code generation section 140 causes the generated codes of each pixel to be held in the code memory 150 (step S905).

To continue, the moving photographic subject detection section 160 detects a moving photographic subject, based on the codes held in the code memory 150 (first codes) and the codes output from the code generation section 140 (second codes), and generates information (moving photographic subject information) related to this moving photographic subject (step S906). Note that, step S906 is an example of a detection procedure described in the present disclosure.

To continue, the image correction section 170 corrects image quality deterioration regions in the combined image generated by the image combination section 130, based on the moving photographic subject information generated by the moving photographic subject detection section 160 (step S907). Then, an image corrected by the image correction section 170 (corrected image) is output (step S908).

Note that, in FIG. 7, an example is shown in which the generation of codes (step S904) and the generation of moving photographic subject information (step S906) are performed after the generation of a combined image (step S904). However, the generation of codes and the generation of moving photographic subject information may be performed prior to the generation of a combined image, or the generation of codes and the generation of moving photographic subject information may be simultaneously performed with the generation of a combined image.

Here, a case will be assumed in which the illumination of a scene is low, and a case will be assumed in which the dynamic range of a photographic subject is narrow. In this case, it is possible to transition from an exposure system for a wide dynamic range, which combines and implements a plurality of images with different exposure times, to an exposure system of one image, which uses only a long time exposure image. That is, it is possible for the imaging device 110 to transition to an exposure system which exposes one image.

In this way, in the case of transitioning to an exposure system which exposes one image, the code generation section 140 executes a code generation process, and continues to update the code memory 150 by causing the generated codes to be held in the code memory 150.

Here, in an exposure system of one image, the short time exposure image corresponding to the long time exposure image is not input to the code generation section 140. In this case, by considering that the input image is the long time exposure image, the code generation section 140 generates a virtual short time exposure image, by multiplying the reciprocal of a ratio (TL/TS) of the exposure times by the long time exposure image. Then, the code generation section 140 executes a code generation process, by using the input long time exposure image and this virtual short time exposure image. Further, in an exposure system of one image, it will be assumed that false color, noise or the like are not be generated due to a moving photographic subject. Accordingly, only an update to the code memory 150 of the generated codes is executed with the code generation process, and a moving photographic subject detection process is not executed.

In this way, in the case where an imaging operation is performed by an exposure system which generates only the long time exposure image, the code generation section 140 can generate and use a virtual short time exposure image corresponding to a ratio of the exposure times based on the long time exposure image.

In this way, by continuing to update the code memory 150, in the case of transitioning from an exposure system which exposes one image to an exposure system which exposes a plurality of images with different exposure times, it becomes possible to output a moving photographic subject detection result from an initial frame after this transition.

2. Second Embodiment

An example has been shown, in the first embodiment of the present disclosure, in which the information amount of an input image is compressed by pixel value units, by coding the input image with the code generation section 140. Here, by compressing the information amount of an input image by block units, the information amount can be further reduced.

Accordingly, an example will be shown, in a second embodiment of the present disclosure, in which the information amount of an input image is compressed by block units.

[Configuration Example of the Image Processing Apparatus]

Figure 8:
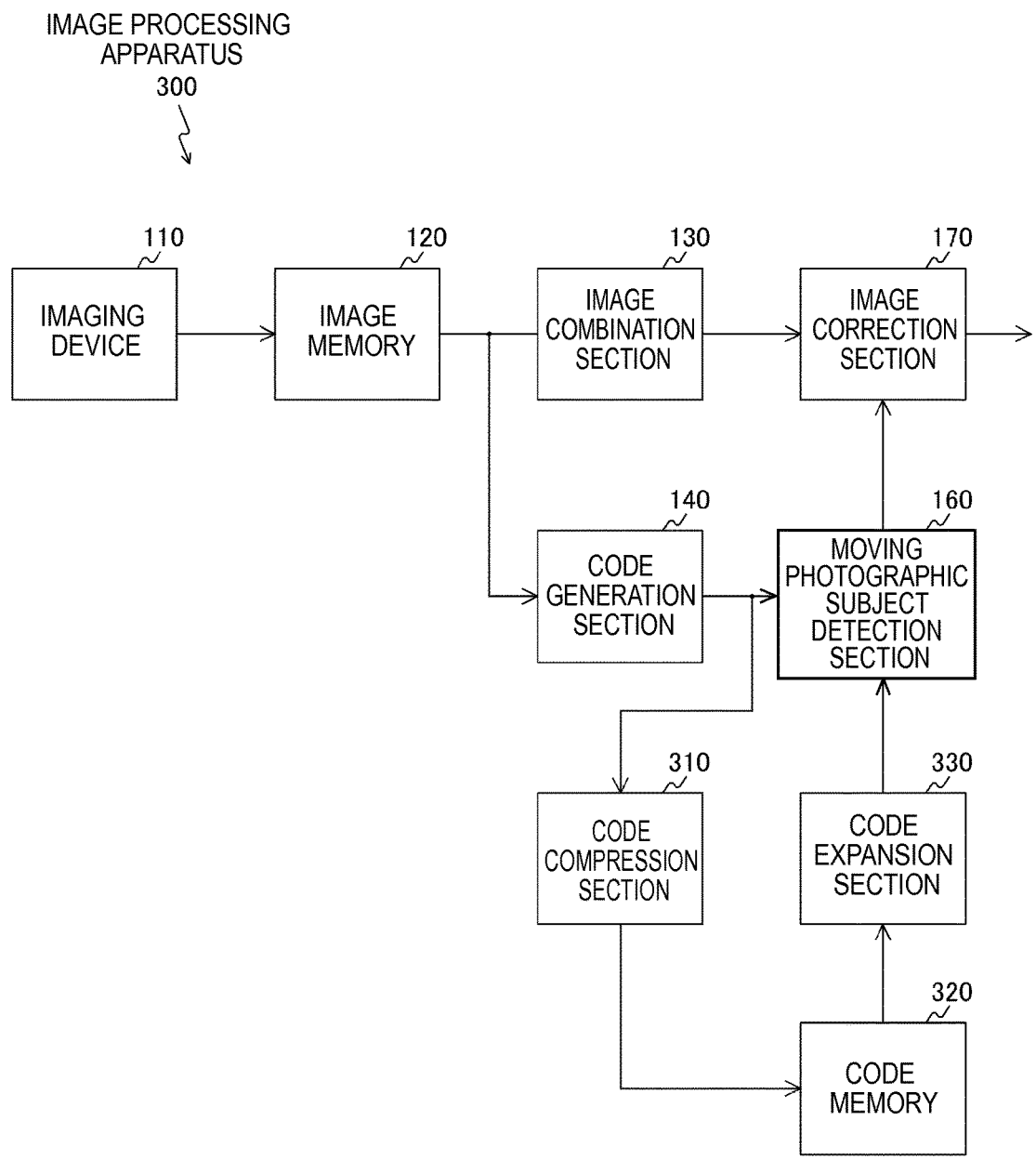
FIG. 8 is a block diagram which shows a functional configuration example of an image processing apparatus 300 in a second embodiment of the present disclosure.

FIG. 8 is a block diagram which shows a functional configuration example of an image processing apparatus 300 in the second embodiment of the present disclosure. Note that, the image processing apparatus 300 is a modified example of the image processing apparatus 100 shown in FIG. 1. Accordingly, the parts of this description which have same reference numerals as those of the image processing apparatus 100 will be omitted for the portions in common with the image processing apparatus 100.

The image processing apparatus 300 includes a code compression section 310, a code memory 320, and a code expansion section 330.

The code compression section 310 compresses codes output from the code generation section 140 by block units of an input image, and causes a code compression result (compressed codes) to be held in the code memory 320. The code compression section 310 can be executed, for example, by having the compression by block units of the input image differentiate the colors of the pixels of the input image. Further, this compression example will be described in detail with reference to FIG. 9. Note that, the code compression section 310 is an example of a compression section described in the present disclosure. Further, the code memory 320 is an example of a memory described in the present disclosure.

The code expansion section 330 reads and expands the code compression result (compressed codes) held in the code memory 320, and outputs these expanded codes to the moving photographic subject detection section 160. Note that, the code expansion section 330 is an example of an expansion section described in the present disclosure.

[Code Compression Example and Code Expansion Example]

FIG. 9 is a figure which schematically shows a code compression example by the code compression section 310, and a code expansion example by the code expansion section 330, in the second embodiment of the present disclosure. Note that, a method is shown in FIG. 9 in which a simple average is used as an example of irreversible compression of a code. Further, an example of an image sensor, to which color filters are attached by a Bayer array, is shown in FIG. 9.

The thick-lined rectangles 341 through to 344 shown in a of FIG. 9 represent meshes constituted by 8×8 pixel units. Further, numerical values (0 through to 3) corresponding to the codes generated by the code generation section 140 are shown inside rectangles which represent each of the pixels within these meshes.

Further, pixels to which diagonal lines are fixed within the rectangles show Red (R), pixels to which horizontal lines are fixed within the rectangles show Blue (B), and pixel to which white color is fixed within the rectangles show Green (G).

The rectangles 345 through to 348 shown in b of FIG. 9 show codes for each of the pixel colors (R, G, B) in the case where each of the codes are compressed within the meshes (the thick-lined rectangles 341 through to 344) shown in a of FIG. 9.

For example, by calculating an average value for the same color pixels within the meshes shown in a of FIG. 9, codes of 64 pixels×2 bit can be compressed into 3 colors (R, G, B)×2 bit, such as shown in b of FIG. 9. Note that, in the case where an average value is calculated, for example, it may be rounded to the nearest decimal place, or may be rounded down or rounded up a decimal place. Note that, the size of the meshes shown in a of FIG. 9 is an example, and may not be limited to this, and may be set to another size.

In this way, each of the codes (the code compression result shown in b of FIG. 9) compressed by the code compression section 310 are held in the code memory 320.

Next, an example will be shown in the case where the code expansion section 330 performs an expansion process for the code compression result held in the code memory 320. Here, as shown in a and b of FIG. 9, an example is shown in which bilinear interpolation is used as an example of the code expansion process in the case where a simple average has been used in the code compression process.

For example, by blending the codes corresponding to the four meshes within the rectangles 345 through to 348 shown in b of FIG. 9, in accordance with a distance from the mesh centers, a code of a pixel of interest position can be expanded.

Further, the moving photographic subject detection section 160 performs a moving photographic subject detection process based on the codes (first codes) output from the code expansion section 330, and the codes (second codes) output from the code generation section 140.

Note that, in the case where the codes are lossy compressed/expanded, there is the possibility that code information of the details of a photographic subject will be lost. Accordingly, preventing the moving photographic subject detection section 160 from performing misdetection will be of importance.

Here, a planar section of the photographic subject has a locally constant brightness, and the codes of the planar section can be expected to continue with the same values to some extent. Accordingly, in the case where a run length method is adapted for coding, there is a high possibility that a high information compression ratio can be attained. Accordingly, for example, an algorithm of a run line method, which is a lossy compression/expansion process, may be applied to the code compression section 310 and the code expansion section 330, so that the information amount of the codes is not lost.

3. Third Embodiment

Here, it will be assumed that a moving photographic subject often moves in some constant direction, in an imaging space corresponding to consecutive frames. In this case, it will be assumed that an accumulated charge of photoelectric conversion elements arranged on a two-dimensional array (lattice shape) in an imaging device has continuality to some extent in this imaging space. In such a region (a region which includes a moving photographic subject), there is the possibility that a combined image selected in an image combination process will have variations within same color pixels, and this will become a factor in the occurrence of false color or noise.

Accordingly, an example will be shown, in the third embodiment of the present disclosure, in which a transition between a past code (first code) and a present code (second code) in a pixel of interest, and variations of present codes (second codes) of vicinity pixels, are taken into consideration in a moving photographic subject detection process. In this way, the accuracy of a final moving photographic subject detection result can be improved. Note that, the configuration of the image processing apparatus in the third embodiment of the present disclosure is approximately the same as that of the image processing apparatus 100 shown in FIG. 1. Accordingly, the parts of this description which have same reference numerals as those of the first embodiment of the present disclosure will be omitted for the portions in common with the first embodiment of the present disclosure. Further, an example of an image sensor, to which color filters are attached by a Bayer array, will be shown in the third embodiment of the present disclosure.

[Detection Example of the Moving Photographic Subject]

FIG. 10 is a figure which shows an example of detection conditions used for a moving photographic subject detection process by the moving photographic subject detection section 160 in the third embodiment of the present disclosure.

An example of a detection rule is shown in a of FIG. 10 in the case where a photographic subject, which is a dark part in an N−1th frame, changes to a bright part in an Nth frame due to the influence of a moving photographic subject. This detection rule is defined as a dark-bright detection condition.

Here, a pixel of interest is one of the pixels constituting an input image, and has the meaning of a pixel which becomes a determination target. Further, vicinity pixels have the meaning of pixels located in the vicinity of the pixel of interest. Here, since each color (R, G, B) may be necessary in the moving photographic subject detection process shown in the third embodiment of the present disclosure, at least 3×3 may become necessary as a prescribed range of the vicinity pixels. For example, as shown in FIG. 11 and FIG. 12, pixels located in a prescribed range (5×3) surrounding pixels of interest 401 through to 404 can be set to vicinity pixels. Further, for example, other ranges (for example, ranges 3×3 through to 9×3) may be set to a prescribed range of vicinity pixels.

For example, the moving photographic subject detection section 160 outputs 1, as a dark-bright detection result, for the pixels which satisfy any of the conditions RI1 through to RI3, and outputs 0, as a dark-bright detection result, for the pixels which do not satisfy any of the conditions RI1 through to RI3. Note that, this detection example will be shown in FIG. 12 and FIG. 12.

Note that, the conditions RI1 through to RI3 may use only one condition, in accordance with an intended moving photographic subject detection region, or may use a plurality of conditions as OR conditions.

An example of a detection rule is shown in b of FIG. 10 in the case where a photographic subject, which is a bright part in an N−1th frame, changes to a dark part in an Nth frame due to the influence of a moving photographic subject. This detection rule is defined as a bright-dark detection condition.

For example, the moving photographic subject detection section 160 outputs 1, as a bright-dark detection result, for the pixels which satisfy any of the conditions RJ1 through to RJ3, and outputs 0, as a bright-dark detection result, for the pixels which do not satisfy any of the conditions RJ1 through to RJ3.

Note that, the conditions RJ1 through to RJ3 may use only one condition, in accordance with an intended moving photographic subject detection region, or may use a plurality of conditions as OR conditions.

Note that, the detection rules shown in a and b of FIG. 10 are examples, and are not limited to these. That is, other detection rules may be adopted, in accordance with the exposure system and an intended moving photographic subject detection region.

Further, the moving photographic subject detection section 160 outputs values (0,1), which take a logical sum (OR) of the bright-dark detection result (0,1) and the dark-bright detection result (0,1), to the image correction section 170 as moving photographic subject information.

FIG. 11 and FIG. 12 are figures which show transition examples of an image used for the moving photographic subject detection process by the moving photographic subject detection section 160 in the third embodiment of the present disclosure. Note that, transition examples of a part of the region within an input image are schematically shown in FIG. 11 and FIG. 12. Further, codes generated by the code generation section 140 are shown, in FIG. 11 and FIG. 12, within rectangles representing pixels.

Further, pixels of interest 401 through to 404 are shown arranged in the centers in FIG. 11 and FIG. 12. Further, examples are shown in which the regions of vicinity pixels are set to regions of 5×3. Further, similar to the example shown in FIG. 9, pixels to which diagonal lines are fixed within the rectangles show R, pixels to which horizontal lines are fixed within the rectangles show B, and pixels to which white color is fixed within the rectangles show G.

In the examples shown in a and b of FIG. 11, the code of the pixel of interest 401 (first code) is A (low luminance region), and the code of the pixel of interest 402 (second code) is D (high luminance region). Accordingly, the condition RB3 shown in b of FIG. 6 will be satisfied.

Further, in the example shown in b of FIG. 11, a color (R (pixels to which diagonal lines are fixed within the rectangles)) in which the maximum luminance satisfies D (high luminance region), and the minimum luminance satisfies other than D (high luminance region), is present in the codes of the vicinity pixels (second codes) of the pixel of interest 402. Accordingly, RI2 shown in a of FIG. 10 will be satisfied. That is, in the examples shown in a and b of FIG. 11, the moving photographic subject detection section 160 outputs 1 as the moving photographic subject information.

In the examples shown in a and b of FIG. 12, the code of the pixel of interest 403 (first code) is A (low luminance region), and the code of the pixel of interest 404 (second code) is D (high luminance region). Accordingly, the condition RB3 shown in b of FIG. 6 will be satisfied. However, the codes of the vicinity pixels (second codes) of the pixel of interest 404 are all D (high luminance region). That is, a color in which the maximum luminance satisfies D (high luminance region), and the minimum luminance satisfies other than D (high luminance region), is not present. Accordingly, the dark-bright condition shown in a of FIG. 10 will not be satisfied. That is, in the examples shown in a and b of FIG. 12, the moving photographic subject detection section 160 outputs 0 as the moving photographic subject information.

In this way, the moving photographic subject detection section 160 can detect a moving photographic subject, based on a transition between a first code and a second code in a pixel of interest which becomes a comparison target, and second codes in pixels in the vicinity of the pixel of interest.

4. Fourth Embodiment

An example will be shown, in a fourth embodiment of the present disclosure, in which a region satisfying a sufficient condition that it is not a moving photographic subject is excluded from a moving photographic subject detection region detected by taking into consideration a transition between a past code (first code) and a present code (second code) in a pixel of interest, in a moving photographic subject detection process.

[Transition Example of a Charge Amount]

Figure 13:
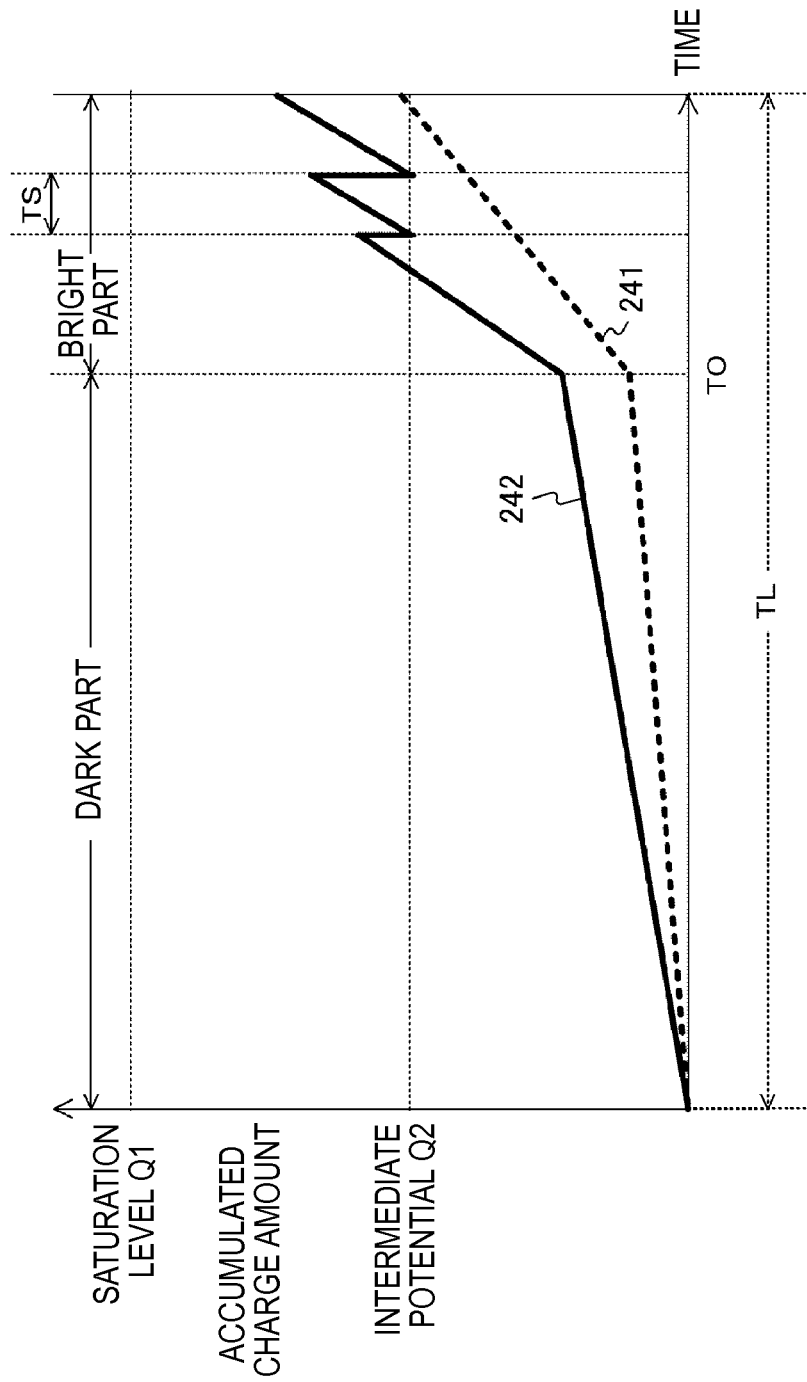
FIG. 13 is a figure which represents a transition of a charge amount of photoelectric conversion elements constituting the imaging device 110 in a fourth embodiment of the present disclosure.

FIG. 13 is a figure which represents a transition of a charge amount of photoelectric conversion elements constituting the imaging device 110 in the fourth embodiment of the preset disclosure. A transition example of an accumulated charge is shown in FIG. 13 in the case where a moving photographic subject is captured which changes from a dark part to a bright part. Note that, since FIG. 13 corresponds to FIG. 4, a description will be made by attaching the same reference numerals to the parts in common with FIG. 4.

In the graph shown in FIG. 13, the period up to time T0 shows a transition example of an accumulated charge in the case where the photographic subject is a dark part, and the period from time T0 onwards shows a transition example of an accumulated charge in the case where the photographic subject is a bright part.

The accumulation rate of the charge is gradual in the period up to time T0 (the period in which the photographic subject is a dark part). However, when changing to the bright part at time T0, the accumulation rate will suddenly rise.

For example, while pixels which have a low sensitivity such as the dotted straight line 241 are not able to acquire a short time exposure image, since the accumulated charge does not reach up to an intermediate potential in the exposure period TS, correct values can be acquired for a long time exposure image. On the other hand, for example, since pixels which have a high sensitivity such as the solid straight line 242 exceed an intermediate potential in the exposure period TS, a comparatively large short time exposure image can be acquired.

Further, in an image combination process by the image combination section 130, a long time exposure image is selected and output as a combined image, for the pixels corresponding to the dotted straight line 241. Further, a short time exposure image is selected and the result of multiplying a gain (TL/TS) corresponding to a ratio of the exposure times is output as a combined image, for the pixels corresponding to the solid straight line 242.

However, the gain used for a combination process of the pixels corresponding to the solid straight line 242 may not reflect the accumulation rate of the charge in a bright part of the solid straight line 242, or the charge amount already accumulated at time T0 may not be taken into account. Accordingly, there is the possibility that a combined image of the solid straight line 242 will not be able to be generated correctly.

For example, a case will be assumed in which a moving photographic subject is captured which changes from a dark part to a bright part such as this, by using a single plate type solid-state image sensor using R, G and B color filters. In this case, since the sensitivity of the photoelectric conversion elements will be different for each color of the color filter, there is the possibility that the occurrence of false color and noise will become significant, by selecting from images with respectively different exposure times for each color. On the other hand, in the case where the same combined image is selected for all colors, the occurrence of false color and noise will be moderated.

Accordingly, an example will be shown, in the fourth embodiment of the present disclosure, in which a region satisfying a sufficient condition that it is not a moving photographic subject is excluded from a moving photographic subject detection region detected by taking into consideration a transition between a past code (first code) and a present code (second code) in a pixel of interest, in a moving photographic subject detection process. In this way, the accuracy of a final moving photographic subject detection result can be improved.

[Detection Example of the Moving Photographic Subject]

FIG. 14 is a figure which shows an example of detection conditions used for a moving photographic subject detection process by the moving photographic subject detection section 160 in the fourth embodiment of the present disclosure.

An example of a sufficient condition that it is not a moving photographic subject is shown in a of FIG. 14. This condition combines with a transition condition of codes, and constitutes a detection rule.

An example of a detection rule is shown in b of FIG. 14 in the case where a photographic subject, which is a dark part in an N−1th frame, changes to a bright part in an Nth frame due to the influence of a moving photographic subject. This detection rule is defined as a dark-bright detection condition.

For example, the moving photographic subject detection section 160 outputs 1, as a dark-bright detection result, for the pixels which satisfy any of the conditions RK1 through to RK3, and outputs 0, as a dark-bright detection result, for the pixels which do not satisfy any of the conditions RK1 through to RK3. Note that, this detection example will be shown in FIG. 12 and FIG. 15.

Note that, the conditions RK1 through to RK3 may use only one condition, in accordance with an intended moving photographic subject detection region, or may use a plurality of conditions as OR conditions.

Further, the dark-bright detection condition shown in b of FIG. 14 becomes a condition weaker (wider) than the dark-bright detection condition shown in a of FIG. 10. Accordingly, the dark-bright detection condition shown in b of FIG. 14, and the dark-bright detection condition shown in a of FIG. 10, may be used separately, in accordance with an intended moving photographic subject detection region.

Further, a bright-dark detection condition in the fourth embodiment of the present disclosure can be constituted by using the bright-dark detection condition shown in a of FIG. 6, or the bright-dark detection condition shown in b of FIG. 10. Further, it may be constituted by using a combination of the bright-dark detection condition shown in a of FIG. 6 and the bright-dark detection condition shown in b of FIG. 10, as a bright-dark detection condition in the fourth embodiment of the present disclosure.

Further, the moving photographic subject detection section 160 outputs values (0,1), which take a logical sum (OR) of the bright-dark detection result (0,1) and the dark-bright detection result (0,1), to the image correction section 170 as moving photographic subject information.

FIG. 15 is a figure which shows transition examples of an image used for the moving photographic subject detection process by the moving photographic subject detection section 160 in the fourth embodiment of the present disclosure. Note that, the example shown in FIG. 15 corresponds to those of FIG. 11 and FIG. 12.

In the example shown in a of FIG. 15, the code of the pixel of interest 405 (first code) is A (low luminance region), and the code of the pixel of interest 406 (second code) is D (high luminance region). Accordingly, the condition RB3 shown in b of FIG. 6 will be satisfied.

Further, in the example shown in b of FIG. 15, the codes of vicinity pixels (second codes) of the pixel of interest 406 are not D (high luminance region) in all the colors. Accordingly, the condition RD1 shown in a of FIG. 14 will not be satisfied. That is, the examples shown in a and b of FIG. 15 will satisfy the condition RK2 shown in b of FIG. 14. Accordingly, the moving photographic subject detection section 160 outputs 1 as the moving photographic subject information.

Further, in the example shown in a of FIG. 12, the code of the pixel of interest 403 (first code) is A (low luminance region), and the code of the pixel of interest 404 (second code) is D (high luminance region). Accordingly, the condition RB3 shown in b of FIG. 6 will be satisfied. However, the codes of the vicinity pixels (second codes) of the pixel of interest 404 are D (high luminance region) for all colors. Accordingly, the condition RD1 shown in a of FIG. 14 will be satisfied. That is, the examples shown in a and b of FIG. 12 will not satisfy any of the conditions RK1 through to RK3 shown in b of FIG. 14. Accordingly, the moving photographic subject detection section 160 outputs 0 as the moving photographic subject information.

In this way, the moving photographic subject detection section 160 can detect a moving photographic subject, based on a transition between a first code and a second code in a pixel of interest which becomes a comparison target, and whether or not the second codes in the pixels in the vicinity of the pixel of interest are all a specific code. Here, for example, the specific code is D (high luminance region) which corresponds to the condition RD1 shown in a of FIG. 14. Further, for example, the specific code is C (transition region) and D (high luminance region) which corresponds to the condition RD2 shown in a of FIG. 14.

5. Fifth Embodiment

An example will be shown, in a fifth embodiment of the present disclosure, in which a system is used which is different to the exposure control system shown in the first through to fourth embodiments of the present disclosure.

[Transition Example of a Charge Amount]

Figure 16:
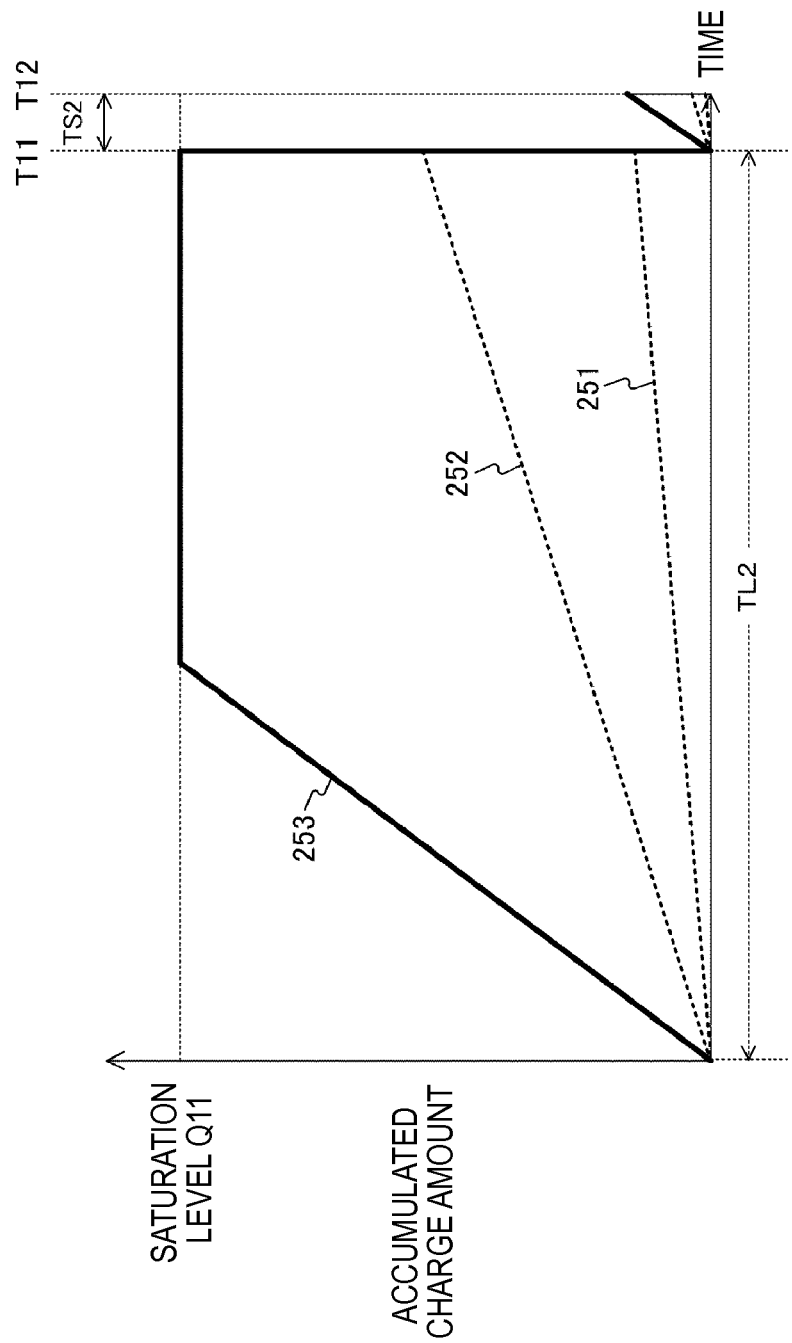
FIG. 16 is a figure which represents a transition of a charge amount of photoelectric conversion elements constituting the imaging device 110 in a fifth embodiment of the present disclosure.

FIG. 16 is a figure which represents a transition of a charge amount of photoelectric conversion elements constituting the imaging device 110 in the fifth embodiment of the present disclosure.

The horizontal axis of the graph shown in FIG. 16 represents a time, and the vertical axis represents a charge amount. Further, an accumulation time of a long time exposure image is represented by TL2, and an accumulation time of a short time exposure image is represented by TS2. Further, a saturation level of the charge accumulation of pixels is represented by Q11.

Further, time T11 represents the timing for reading the charge accumulated in the period TL2, and time T12 represents the timing for reading the charge accumulated in the period TS2.

For example, the charge accumulated in the photoelectric conversion elements in the period TL2 is read, and the read charge is AD converted and output from the imaging device 110 as a long time exposure image. Further, the accumulated charge accumulated in the photoelectric conversion elements in the period TS2 is read, and the read charge is AD converted and output from the imaging device 110 as a short time exposure image.

Here, in the case of a low luminance signal, an accumulation process of the charge will be undertaken, such as shown in the dotted straight line 251. Accordingly, signals with a good S/N are obtained in the long time exposure image. Further, in the case of an intermediate luminance signal, an accumulation process of the charge will be undertaken, such as shown in the dotted straight line 252. Accordingly, signals with a good S/N are obtained in the long time exposure image.

Further, in the case of a high luminance signal, an accumulation process of the charge will be undertaken, such as shown in the solid straight line 253. Accordingly, the long time exposure image will be saturated. Accordingly, a true value can be calculated by multiplying the gain (TL/TS) corresponding to a ratio of the exposure times by the pixel values of the short time exposure image. Codes are generated, by using the pixel values of the short time exposure image and the pixel values of the long time exposure image generated such as this. A generation example of these codes will be shown in FIG. 17.

[Generation Example of Codes]

Figure 17:
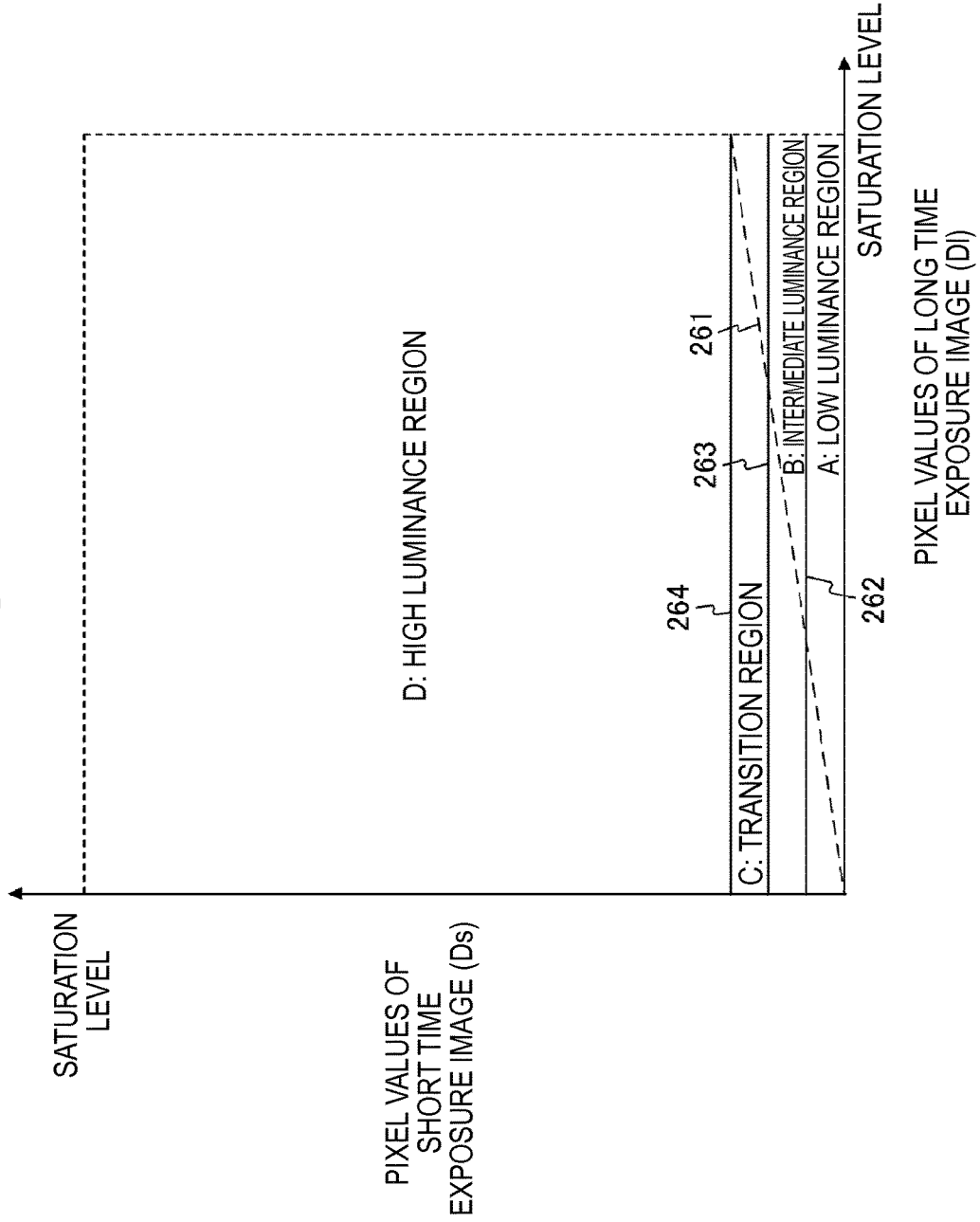
FIG. 17 is a figure which schematically shows an example of a code generation process by the code generation section 140 in the fifth embodiment of the present disclosure.

FIG. 17 is a figure which schematically shows an example of a code generation process by the code generation section 140 in the fifth embodiment of the present disclosure.

The horizontal axis of the graph shown in FIG. 17 represents pixel values D1 of the long time exposure image 202, and the vertical axis represents pixel values Ds of the short time exposure image 201.

The dotted straight line 261 is a straight line in which the reciprocal of a ratio TL2/TS2 of exposure times is set to an inclination. Note that, in the case where a still photographic subject is captured, it will be plotted on the dotted straight line 261, as long as the long time exposure image is not saturated.

In the case where the exposure control system shown in FIG. 16 is adopted, the brightness of the photographic subject in each frame can be determined by referring to the pixel values Ds of the short time exposure image 201. Accordingly, region segmentation for code determination is defined such as follows.

The region below the solid straight line 262 is defined as a low luminance region A. Here, the solid straight line 262 is specified by a predetermined threshold for defining the low luminance region A.

Further, the region above the solid straight line 262 and below the solid straight line 263 is defined as an intermediate luminance region B. The solid straight line 263 is specified by a predetermined threshold for defining the intermediate luminance region B.

Further, the region above the straight line 263 and below the solid straight line 264 is defined as a transition region C. The solid straight line 264 is specified by a predetermined threshold for defining the transition region C.

Further, the region above the straight line 264 is defined as a high luminance region D.

In this way, each of the regions A through to D are defined in the graph shown in FIG. 17. Also, the code generation section 140 codes each of the pixels, by using each of these regions A through to D.

Specifically, the code generation section 140 plots, on the graph shown in FIG. 17, the pixel values Ds of the short time exposure image 201 and the pixel values D1 of the long time exposure image 202, by using the short time exposure image 201 and the long time exposure image 202.

To continue, the code generation section 140 classifies the points plotted in the graph shown in FIG. 17 into the four regions of the low luminance region A, the intermediate luminance region B, the transition region C and the high luminance region D. Then, the code generation section 140 codes each pixel into codes corresponding to each of the regions of the low luminance region A, the intermediate luminance region B, the transition region C and the high luminance region D.

For example, the code generation section 140 can perform coding so as to set the low luminance region A to 0, set the intermediate luminance region B to 1, set the transition region C to 2, and set the high luminance region D to 3.

Further, the code generation section 140 outputs the generated codes to the moving photographic subject detection section 160, and causes the output codes to be held in the code memory 150. In this way, the codes held in the code memory 150 are supplied to the moving photographic subject detection section 160. For example, the codes held in the code memory 150 in an N−1th frame are used in moving photographic subject detection for an input image of an Nth frame.

Note that, since each of the processes from here onwards can apply each of the processes shown in the first through to fourth embodiments of the present disclosure, a description of them will be omitted here. In this way, the code generation section 140 can generate codes for each pixel, based on a comparison result between values specified by the pixel values of the short time exposure image and the pixel values of the long time exposure image, and a threshold.

6. Sixth Embodiment

An example will be shown, in a sixth embodiment of the present disclosure, in which the first through to the fifth embodiments of the present disclosure are applied to a layered-type CMOS image sensor.

FIG. 18 is a figure which shows simplified a layered-type CMOS image sensor in the sixth embodiment of the present disclosure.

A layered-type CMOS image sensor applied to the first through to fifth embodiments of the present disclosure is shown simplified in a of FIG. 18. Further, an inverse irradiation-type CMOS image sensor of the related art, which is a comparison example to the layered-type CMOS image sensor shown in a of FIG. 18, is shown simplified in b of FIG. 18.

The inverse irradiation-type CMOS image sensor shown in b of FIG. 18 is mounted with a pixel section (sensor section) 711 and a circuit section (analogue logic circuit) 712 on a same chip. Accordingly, there will be many constraints, such as a circuit scale and chip size, measures against noise by the arrangement of the pixel section and the circuit section, optimization of pixel characteristics and circuit transistor characteristics or the like. Accordingly, solving these constraints and installing a large-scale circuit will be of importance.

In the layered-type CMOS image sensor shown in a of FIG. 18, a chip 702 is used on which a logic circuit section (signal processing circuit) is formed, instead of a support substrate 713 of the inverse irradiation-type CMOS image sensor shown in b of FIG. 18. Also, a pixel section 701, on which inverse irradiation-type pixels are formed, is superimposed on this.

By setting to the layered structure shown in a of FIG. 18, it is possible to mount a large-scale circuit with a small chip size. Further, since the pixel section and the circuit section are formed as respectively independent chips, a manufacturing process can be adopted in which the pixel section is specified to a high quality and the circuit section is specified to a high functionality. Accordingly, high quality, high functionality and a small size can be implemented at the same time.

FIG. 19 is a block diagram which shows a functional configuration example of a layered-type CMOS image sensor 700 in the sixth embodiment of the present disclosure. Note that, the layered-type CMOS image sensor 700 is a modified example of the image processing apparatus 100 shown in FIG. 1. Accordingly, the parts of this description which have same reference numerals as those of the image processing apparatus 100 will be omitted for the portions in common with the image processing apparatus 100.

The layered-type CMOS image sensor 700 includes a pixel section (sensor section) 721 and a logic circuit section 722. Further, the pixel section (sensor section) 721 and the logic circuit section 722 correspond to the pixel section (sensor section) 701 and the chip 702 (logic circuit section) shown in a of FIG. 18.

Further, the pixel section (sensor section) 721 includes an imaging device 110. Further, the logic circuit section 722 includes an image memory 120, an image combination section 130, a code generation section 140, a code memory 150, a moving photographic subject detection section 160, and an image correction section 170.

As shown in the first through to fifth embodiments of the present disclosure, the memory capacity which may be necessary for a moving photographic subject detection process can be set to a very small size. Accordingly, it becomes possible for the logic circuit section 722 shown in FIG. 19 to be mounted on a logic circuit section (for example, the chip 702 shown in a of FIG. 18) of the layered-type CMOS image sensor 700.

In this way, according to an embodiment of the present disclosure, the information amount of images which may become necessary in a moving photographic subject detection process can be appropriately reduced, and the memory capacity which may become necessary in a moving photographic subject detection process can be reduced. That is, information related to each of the pixels constituting a past image can be held in a code memory with a smaller information amount (code amount). In this way, in a moving photographic subject detection process, the region of a moving photographic subject which may become a factor of false color and noise can be detected with a smaller memory. Further, since the memory capacity which may become necessary for a moving photographic subject detection process can be reduced, the cost of the image processing apparatus can be reduced.

For example, a case will be assumed in which a long time exposure image and a short time exposure image with a size of 1296×976, which is an AD conversion bit accuracy of the imaging device 110 of 12 bit, are combined with a ratio 16 times of the exposure time. For example, in the case where a moving photographic subject detection process is performed which detects a moving photographic subject by holding a combined image in the image memory, a memory capacity of approximately (12+log 2(16))bit×1296×976=2.5 MB may be necessary. On the other hand, in the embodiments of the present disclosure, the memory capacity can be reduced to approximately 2 bit×1296×976=317 KB (approximately 12.5%).

Further, as shown in the second embodiment of the present disclosure, in the case where the size of the mesh is set to 8×8, the memory capacity can be reduced to approximately 6 bit×(1296/8)×(976/8)=15 KB (approximately 0.6%).

Further, according to an embodiment of the present disclosure, since code information used in a moving photographic subject detection process has characteristics which are easily and reversibly compressed, the memory capacity can be reduced, without a loss of accuracy of the moving photographic subject detection process.

Note that, the embodiments of the present disclose may be applied to another image processing apparatus, such as a portable-type information processing apparatus with an imaging function, or a fixed-type information processing apparatus with an imaging function. Note that, the portable-type information processing apparatus with an imaging function is, for example, a mobile phone device with an imaging function, a smart phone with an imaging function, or a tablet terminal with an imaging function. Further, the fixed-type information processing apparatus with an imaging function is, for example, a personal computer with an imaging function, a video system with an imaging function, or an editing apparatus with an imaging function. Further, the embodiments of the present disclosure may be applied to an image processing apparatus which performs an image process, by acquiring images (image data) generated by an external apparatus.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray (registered trademark) disc can be used.

In addition, the effects described in the present specification are not limiting but are merely examples, and there may be other effects.

Additionally, the present technology may also be configured as below.

(1) An image processing apparatus including:
a generation section which generates, based on a plurality of images captured at different exposure times, index information representing an index of a brightness of the plurality of images; and
a detection section which detects a moving photographic subject included in the plurality of images based on the index information.

(2) The image processing apparatus according to (1),
wherein the generation section generates the index information for each pixel based on a comparison result between pixel values of the plurality of images and a threshold.

(3) The image processing apparatus according to (2),
wherein the plurality of images are a short time exposure image and a long time exposure image, and
wherein the generation section generates the index information for each pixel based on a comparison result between values specified by pixel values of the short time exposure image and a sum of pixel values of the short time exposure image and pixel values of the long time exposure image, and the threshold.

(4) The image processing apparatus according to (2),
wherein the plurality of images are a short time exposure image and a long time exposure image, and
wherein the generation section generates the index information for each pixel based on a comparison result between values specified by pixel values of the short time exposure image and pixel values of the long time exposure image, and the threshold.

(5) The image processing apparatus according to any one of (1) to (4),
wherein the plurality of images are a short time exposure image and a long time exposure image, and
wherein the generation section generates the index information for each pixel by classifying and coding each pixel constituting the plurality of images into a first level in which pixels of the long time exposure image are used in an image combination process which generates a combined image by combining the plurality of images, a second level in which a sum of pixels of the long time exposure image and pixels of the short time exposure image are used in the image combination process, a third level in which pixels of the short time exposure image are used in the image combination process, and a fourth level which belongs between the second level and the third level.

(6) The image processing apparatus according to any one of (1) to (5),
wherein the plurality of images are a short time exposure image and a long time exposure image, and
wherein, in the case where an imaging operation is performed by an exposure system which generates only the long time exposure image from among the short time exposure image and the long time exposure image, the generation section generates and uses a virtual short time exposure image corresponding to a ratio of exposure times based on the long time exposure image.

(7) The image processing apparatus according to any one of (1) to (6),
wherein the detection section detects the moving photographic subject based on a plurality of the index information generated at different times.

(8) The image processing apparatus according to (7),
wherein the detection section detects the moving photographic subject based on a comparison result between first index information which is the index information generated at a first time, and second index information which is the index information generated at a second time later than the first time.

(9) The image processing apparatus according to (8),
wherein the detection section detects the moving photographic subject based on a transition between the first index information and the second index information.

(10) The image processing apparatus according to (9),
wherein the detection section detects the moving photographic subject based on a transition between the first index information and the second index information in a pixel of interest which becomes a comparison target, and the second index information in pixels in the vicinity of the pixel of interest.

(11) The image processing apparatus according to (9),
wherein the detection section detects the moving photographic subject based on a transition between the first index information and the second index information in a pixel of interest which becomes a comparison target, and whether or not the second index information in pixels in the vicinity of the pixel of interest is all specific index information.

(12) The image processing apparatus according to any one of (1) to (11), further including:
a compression section which compresses the index information;
a memory which holds the compressed index information; and
an expansion section which reads and expands the compressed index information held in the memory,
wherein the detection section detects the moving photographic subject based on the expanded index information.

(13) The image processing apparatus according to any one of (1) to (12), further including:
an image combination section which generates a combined image by combining the plurality of images; and
an image correction section which corrects the combined image based on information related to the detected moving photographic subject.

(14) An image processing method including:
a generation mechanism which generates, based on a plurality of images captured at different exposure times, index information representing an index of a brightness of the plurality of images; and
a detection mechanism which detects a moving photographic subject included in the plurality of images based on the index information.

(15) A program for causing a computer to execute:
a generation mechanism which generates, based on a plurality of images captured at different exposure times, index information representing an index of a brightness of the plurality of images; and
a detection mechanism which detects a moving photographic subject included in the plurality of images based on the index information.

What is claimed is:
1. An image processing apparatus comprising:
a code generation section which generates, based on a comparison result between pixel values for corresponding pixels obtained from at least first and second images captured at first and second exposure times and first and second exposure durations respectively by an imaging device having multiple pixels and at least a first threshold, a code representing a brightness region for each of a plurality of pixels of the first and second images obtained by an imaging device, wherein each brightness region encompasses a range of luminance values, and wherein a spacing between brightness regions is unequal;
a code memory, wherein at least a first set of the codes generated by the code generation section for the pixels of at least the first image are stored in the code memory;
a moving photographic detection section which detects a moving photographic subject included in the plurality of images based on the generated codes by detecting a transition between a code generated for at least a first pixel included in the first set of codes compared to a code generated for the first pixel included in a second set of codes;
an image combination section which generates a combined image by combining the plurality of images, wherein the generated code for any one of the pixels in the plurality of pixels is not equal to a luminance value for the pixel in the combined image; and
an image correction section which corrects the combined image based on information related to the detected moving photographic subject.

2. The image processing apparatus according to claim 1, wherein the code generation section generates the code for each pixel based on a comparison result between pixel values of the plurality of images and a threshold.

3. The image processing apparatus according to claim 2, wherein the first and second images are a short time exposure image and a long time exposure image, and
wherein the code generation section generates the code for each pixel based on a comparison result between values specified by pixel values of the short time exposure image and a sum of pixel values of the short time exposure image and pixel values of the long time exposure image, and the threshold.

4. The image processing apparatus according to claim 2, wherein the first and second images are a short time exposure image and a long time exposure image, and
wherein the code generation section generates the code for each pixel based on a comparison result between values specified by pixel values of the short time exposure image and pixel values of the long time exposure image, and the threshold.

5. The image processing apparatus according to claim 1, wherein the first and second images are a short time exposure image and a long time exposure image, and
wherein the code generation section generates the code for each pixel by classifying and coding each pixel constituting the plurality of images into a first level in which pixels of the long time exposure image are used in an image combination process which generates a combined image by combining the plurality of images, a second level in which a sum of pixels of the long time exposure image and pixels of the short time exposure image are used in the image combination process, a third level in which pixels of the short time exposure image are used in the image combination process, and a fourth level which belongs between the second level and the third level.

6. The image processing apparatus according to claim 1, wherein the first and second images are a short time exposure image and a long time exposure image, and wherein, in the case where an imaging operation is performed by an exposure system which generates only the long time exposure image from among the short time exposure image and the long time exposure image, the code generation section generates and uses a virtual short time exposure image corresponding to a ratio of exposure times based on the long time exposure image.

7. The image processing apparatus according to claim 1, wherein the moving photographic detection section detects the moving photographic subject based on a plurality of the codes generated at different times.

8. The image processing apparatus according to claim 1, wherein the moving photographic detection section detects the moving photographic subject is further based on a transition between the first code from the first pixel included in the first image and codes for other pixels included in the second image that are in a vicinity of the first pixel.

9. The image processing apparatus according to claim 1, wherein the moving photographic detection section detects the moving photographic subject based on a transition between the first code from the first pixel included in the first image and codes for other pixels included in the second image that are in a vicinity of the pixel of interest and that are all have a same code value.

10. The image processing apparatus according to claim 1, further comprising:
a compression section which compresses the code information;
a memory which holds the compressed code information; and
an expansion section which reads and expands the compressed code information held in the memory,
wherein the moving photographic detection section detects the moving photographic subject based on the expanded code information.

11. An image processing method comprising:
a code generation mechanism which generates, based on a comparison result between pixel values for corresponding pixels obtained from at least first and second images captured at first and second exposure times and first and second exposure durations respectively and at least a first threshold, a code representing a brightness region of each of a plurality of pixels in the first and second images, wherein each brightness region encompasses a range of luminance values, and wherein a spacing between brightness regions is unequal;
a code memory, wherein at least a first set of the codes generated by the code generation mechanism are stored in the code memory;
a moving photographic detection mechanism which detects a moving photographic subject included in the plurality of images based on the generated codes by detecting a transition between a code generated for at least a first pixel included in the first set of codes compared to a code generated for the first pixel included in a second set of codes;
an image combination section which generates a combined image by combining the plurality of images, wherein the generated code for any one of the pixels in the plurality of pixels is not equal to a luminance value for the pixel in the combined image; and
an image correction section which corrects the combined image based on information related to the detected moving photographic subject.

12. A non-transitory computer readable medium having encoded therein a program for causing a computer to execute a plurality of mechanisms, comprising:
a code generation mechanism which generates, based on a comparison result between pixel values for corresponding pixels obtained from at least first and second images captured at first and second exposure times and first and second exposure durations respectively, a code representing an index of a brightness of a brightness region each of a plurality of pixels of the first and second images obtained by an imaging device and at least a first threshold, wherein each brightness region encompasses a range of luminance values, and wherein a spacing between brightness regions is unequal; and
a moving photographic detection mechanism which detects a moving photographic subject included in the plurality of images based on the generated codes by detecting a transition between a code generated for at least a first pixel included in a first set of codes compared to a code generated for the first pixel included in a second set of codes;
an image combination section which generates a combined image by combining the plurality of images, wherein the generated code for any one of the pixels in the plurality of pixels is not equal to a luminance value for the pixel in the combined image; and
an image correction section which corrects the combined image based on information related to the detected moving photographic subject.

* * * * *